US010387962B1

(12) United States Patent
Potter et al.

(10) Patent No.: US 10,387,962 B1
(45) Date of Patent: Aug. 20, 2019

(54) METHODS OF RECONSTRUCTING AN ACCIDENT SCENE USING TELEMATICS DATA

(71) Applicant: STATE FARM MUTUAL AUTOMOBILE INSURANCE COMPANY, Bloomington, IL (US)

(72) Inventors: Thomas Michael Potter, Normal, IL (US); Mark E. Clauss, Bloomington, IL (US); Dustin Ryan Carter, Normal, IL (US); Douglas Albert Graff, Mountain View, MO (US); Megan Michal Baumann, Bloomington, IL (US); Atlanta Bonnom, Bloomington, IL (US); Craig Cope, Bloomington, IL (US); Jennifer Luella Lawyer, Bloomington, IL (US); Curtis Simpson, Bloomington, IL (US); Nathan W. Baumann, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 833 days.

(21) Appl. No.: 14/798,745

(22) Filed: Jul. 14, 2015

Related U.S. Application Data

(60) Provisional application No. 62/145,022, filed on Apr. 9, 2015, provisional application No. 62/145,234, filed
(Continued)

(51) Int. Cl.
*G06Q 40/00* (2012.01)
*G06Q 40/08* (2012.01)

(52) U.S. Cl.
CPC .................................... *G06Q 40/08* (2013.01)

(58) Field of Classification Search
CPC ...................................................... G06Q 40/08
See application file for complete search history.

(56) References Cited

U.S. PATENT DOCUMENTS

| | | | |
|---|---|---|---|
| 4,218,763 | A | 8/1980 | Kelley et al. |
| 4,565,997 | A | 1/1986 | Seko et al. |

(Continued)

FOREIGN PATENT DOCUMENTS

| | | | |
|---|---|---|---|
| EP | 700009 | A2 | 3/1996 |
| GB | 2268608 | A | 1/1994 |

(Continued)

OTHER PUBLICATIONS

"Driverless Cars . . . The Future is Already Here", AutoInsurance Center, downloaded from the Internet at: <http://www.autoinsurancecenter.com/driverless-cars...the-future-is-already-here.htm> (2010; downloaded on Mar. 27, 2014).

(Continued)

*Primary Examiner* — Rajesh Khattar
(74) *Attorney, Agent, or Firm* — Marshall, Gerstein & Borun LLP; Randall G. Rueth

(57) ABSTRACT

In systems and methods for accident scene reconstruction, accident data associated with a vehicle accident involving a driver may be collected. The accident data may include vehicle telematics and/or other data, and/or the driver may be associated with an insurance policy. The accident data may be analyzed and, based upon the analysis of the accident data, a sequence of events occurring before, during, and/or after the vehicle accident may be determined. Based upon the determined sequence of events, a virtual reconstruction of the vehicle accident and/or a scene of the vehicle accident may be generated. The virtual reconstruction may include images of vehicles and/or road, weather, traffic, or construction conditions at the time of the accident. Based upon the virtual reconstruction, fault of the driver, or lack (Continued)

thereof, for the accident may be determined. The determined fault may be used to handle an insurance claim associated with the vehicle accident.

18 Claims, 5 Drawing Sheets

Related U.S. Application Data on Apr. 9, 2015, provisional application No. 62/145,027, filed on Apr. 9, 2015, provisional application No. 62/145,228, filed on Apr. 9, 2015, provisional application No. 62/145,029, filed on Apr. 9, 2015, provisional application No. 62/145,232, filed on Apr. 9, 2015, provisional application No. 62/145,032, filed on Apr. 9, 2015, provisional application No. 62/145,033, filed on Apr. 9, 2015, provisional application No. 62/145,024, filed on Apr. 9, 2015, provisional application No. 62/145,028, filed on Apr. 9, 2015, provisional application No. 62/145,145, filed on Apr. 9, 2015, provisional application No. 62/040,735, filed on Aug. 22, 2014, provisional application No. 62/027,021, filed on Jul. 21, 2014.

(56) References Cited

U.S. PATENT DOCUMENTS 5,363,298 A 11/1994 Survanshi et al.
5,367,456 A 11/1994 Summerville et al.
5,368,484 A 11/1994 Copperman et al.
5,436,839 A 7/1995 Dausch et al.
5,488,353 A 1/1996 Kawakami et al.
5,499,182 A 3/1996 Ousborne
5,515,026 A 5/1996 Ewert
5,574,641 A 11/1996 Kawakami et al.
5,626,362 A 5/1997 Mottola
5,797,134 A 8/1998 McMillan et al.
5,835,008 A 11/1998 Colemere, Jr.
5,983,161 A 11/1999 Lemelson et al.
6,031,354 A 2/2000 Wiley et al.
6,064,970 A 5/2000 McMillan et al.
6,067,488 A 5/2000 Tano
6,141,611 A 10/2000 MacKey et al.
6,246,933 B1 6/2001 Bague
6,253,129 B1 6/2001 Jenkins et al.
6,285,931 B1 9/2001 Hattori et al.
6,298,290 B1 10/2001 Abe et al.
6,313,749 B1 11/2001 Horne et al.
6,400,835 B1 6/2002 Lemelson et al.
6,473,000 B1 10/2002 Secreet et al.
6,477,117 B1 11/2002 Narayanaswami et al.
6,553,354 B1 4/2003 Hausner et al.
6,556,905 B1 4/2003 Mittelsteadt et al.
6,570,609 B1 5/2003 Heien
6,661,345 B1 12/2003 Bevan et al.
6,704,434 B1 3/2004 Sakoh et al.
6,795,759 B2 9/2004 Doyle
6,832,141 B2 12/2004 Skeen et al.
6,909,947 B2 6/2005 Douros et al.
6,934,365 B2 8/2005 Suganuma et al.
6,989,737 B2 1/2006 Yasui
7,027,621 B1 4/2006 Prokoski
7,054,723 B2 5/2006 Seto et al.
7,138,922 B2 11/2006 Strumolo et al.
7,149,533 B2 12/2006 Laird et al.
7,253,724 B2 8/2007 Prakah-Asante et al.
7,254,482 B2 8/2007 Kawasaki et al.
7,302,344 B2 11/2007 Olney et al.
7,315,233 B2 1/2008 Yuhara
7,330,124 B2 2/2008 Ota
7,356,392 B2 4/2008 Hubbard et al.
7,386,376 B2 6/2008 Basir et al.
7,424,414 B2 9/2008 Craft
7,565,230 B2 7/2009 Gardner et al.
7,609,150 B2 10/2009 Wheatley et al.
7,639,148 B2 12/2009 Victor
7,692,552 B2 4/2010 Harrington et al.
7,719,431 B2 5/2010 Bolourchi
7,783,505 B2 8/2010 Roschelle et al.
7,792,328 B2 9/2010 Albertson et al.
7,812,712 B2 10/2010 White et al.
7,835,834 B2 11/2010 Smith et al.
7,865,378 B2 1/2011 Gay
7,870,010 B2 1/2011 Joao
7,881,951 B2 2/2011 Roschelle et al.
7,890,355 B2 2/2011 Gay et al.
7,904,219 B1 3/2011 Lowrey et al.
7,912,740 B2 * 3/2011 Vahidi .................... G06Q 10/10 705/35
7,979,172 B2 7/2011 Breed
7,979,173 B2 7/2011 Breed
7,987,103 B2 7/2011 Gay et al.
7,991,629 B2 8/2011 Gay et al.
8,005,467 B2 8/2011 Gerlach et al.
8,009,051 B2 8/2011 Omi
8,010,283 B2 8/2011 Yoshida et al.
8,016,595 B2 9/2011 Aoki et al.
8,027,853 B1 9/2011 Kazenas
8,035,508 B2 10/2011 Breed
8,040,247 B2 10/2011 Gunaratne
8,090,598 B2 1/2012 Bauer et al.
8,095,394 B2 1/2012 Nowak et al.
8,117,049 B2 2/2012 Berkobin et al.
8,140,358 B1 3/2012 Ling et al.
8,140,359 B2 3/2012 Daniel
8,180,522 B2 5/2012 Tuff
8,180,655 B1 5/2012 Hopkins, III
8,185,380 B2 5/2012 Kameyama
8,188,887 B2 5/2012 Catten et al.
8,190,323 B2 5/2012 Maeda et al.
8,204,766 B2 * 6/2012 Bush ...................... G06Q 20/10 705/2
8,255,243 B2 8/2012 Raines et al.
8,255,244 B2 8/2012 Raines et al.
8,260,489 B2 9/2012 Nielsen et al.
8,260,639 B1 9/2012 Medina, III et al.
8,265,861 B2 9/2012 Ikeda et al.
8,280,752 B1 10/2012 Cripe et al.
8,311,858 B2 11/2012 Everett et al.
8,314,708 B2 11/2012 Gunderson et al.
8,340,893 B2 12/2012 Yamaguchi et al.
8,340,902 B1 12/2012 Chiang
8,344,849 B2 1/2013 Larsson et al.
8,352,118 B1 1/2013 Mittelsteadt et al.
8,355,837 B2 1/2013 Avery et al.
8,364,391 B2 1/2013 Nagase et al.
8,384,534 B2 2/2013 James et al.
8,386,168 B2 2/2013 Hao
8,423,239 B2 4/2013 Blumer et al.
8,447,231 B2 5/2013 Bai et al.
8,451,105 B2 5/2013 McNay
8,457,880 B1 6/2013 Malalur et al.
8,473,143 B2 6/2013 Stark et al.
8,487,775 B2 7/2013 Victor et al.
8,554,468 B1 10/2013 Bullock
8,554,587 B1 10/2013 Nowak et al.
8,566,126 B1 10/2013 Hopkins, III
8,595,034 B2 11/2013 Bauer et al.
8,595,037 B1 11/2013 Hyde et al.
8,606,512 B1 * 12/2013 Bogovich ............. G06Q 40/08 340/995.28
8,645,014 B1 2/2014 Kozlowski et al.
8,645,029 B2 2/2014 Kim et al.
8,698,639 B2 4/2014 Fung et al.
8,700,251 B1 4/2014 Zhu et al.
8,742,936 B2 6/2014 Galley et al.
8,781,442 B1 7/2014 Link, II
8,781,669 B1 7/2014 Teller et al.
8,788,299 B1 7/2014 Medina, III
8,799,034 B1 8/2014 Brandmaier et al.
8,816,836 B2 8/2014 Lee et al.

(56) References Cited

U.S. PATENT DOCUMENTS

| | | | | |
|---|---|---|---|---|
| 8,849,558 | B2 | 9/2014 | Morotomi et al. | |
| 8,876,535 | B2 | 11/2014 | Fields et al. | |
| 8,880,291 | B2 | 11/2014 | Hampiholi | |
| 8,954,226 | B1 | 2/2015 | Binion et al. | |
| 8,965,677 | B2 | 2/2015 | Breed et al. | |
| 9,019,092 | B1 | 4/2015 | Brandmaier et al. | |
| 9,049,584 | B2 | 6/2015 | Hatton | |
| 9,053,588 | B1 | 6/2015 | Briggs et al. | |
| 9,056,395 | B1 | 6/2015 | Ferguson et al. | |
| 9,070,243 | B1 | 6/2015 | Kozlowski et al. | |
| 9,079,587 | B1 | 7/2015 | Rupp et al. | |
| 9,135,803 | B1 | 9/2015 | Fields et al. | |
| 9,141,995 | B1 * | 9/2015 | Brinkmann | G06Q 40/08 |
| 9,141,996 | B2 | 9/2015 | Christensen et al. | |
| 9,147,219 | B2 | 9/2015 | Binion et al. | |
| 9,147,353 | B1 | 9/2015 | Slusar | |
| 9,164,507 | B2 | 10/2015 | Cheatham, III et al. | |
| 9,205,842 | B1 | 12/2015 | Fields et al. | |
| 9,262,787 | B2 | 2/2016 | Binion et al. | |
| 9,274,525 | B1 | 3/2016 | Ferguson et al. | |
| 9,275,417 | B2 | 3/2016 | Binion et al. | |
| 9,275,552 | B1 | 3/2016 | Fields et al. | |
| 9,282,430 | B1 | 3/2016 | Brandmaier et al. | |
| 9,282,447 | B2 | 3/2016 | Gianakis | |
| 9,283,847 | B2 | 3/2016 | Riley, Sr. et al. | |
| 9,299,108 | B2 | 3/2016 | Diana et al. | |
| 9,317,983 | B2 | 4/2016 | Ricci | |
| 9,342,993 | B1 | 5/2016 | Fields et al. | |
| 9,352,709 | B2 | 5/2016 | Brenneis et al. | |
| 9,355,423 | B1 | 5/2016 | Slusar | |
| 9,361,650 | B2 | 6/2016 | Binion et al. | |
| 9,376,090 | B2 | 6/2016 | Gennermann | |
| 9,384,491 | B1 | 7/2016 | Briggs et al. | |
| 9,390,451 | B1 | 7/2016 | Slusar | |
| 9,430,944 | B2 | 8/2016 | Grimm et al. | |
| 9,440,657 | B1 | 9/2016 | Fields et al. | |
| 9,443,152 | B2 | 9/2016 | Atsmon et al. | |
| 9,454,786 | B1 | 9/2016 | Srey et al. | |
| 9,466,214 | B2 | 10/2016 | Fuehrer | |
| 9,477,990 | B1 | 10/2016 | Binion et al. | |
| 9,478,150 | B1 | 10/2016 | Fields et al. | |
| 9,505,494 | B1 | 11/2016 | Marlow et al. | |
| 9,530,333 | B1 | 12/2016 | Fields et al. | |
| 2001/0005217 | A1 | 6/2001 | Hamilton et al. | |
| 2002/0016655 | A1 | 2/2002 | Joao | |
| 2002/0111725 | A1 | 8/2002 | Burge | |
| 2002/0116228 | A1 | 8/2002 | Bauer et al. | |
| 2002/0128882 | A1 | 9/2002 | Nakagawa et al. | |
| 2002/0146667 | A1 | 10/2002 | Dowdell et al. | |
| 2003/0028298 | A1 | 2/2003 | Macky et al. | |
| 2003/0046003 | A1 * | 3/2003 | Smith | G01C 15/00 701/32.2 |
| 2003/0061160 | A1 | 3/2003 | Asahina | |
| 2003/0139948 | A1 | 7/2003 | Strech | |
| 2003/0200123 | A1 | 10/2003 | Burge et al. | |
| 2004/0005927 | A1 | 1/2004 | Bonilla et al. | |
| 2004/0017106 | A1 | 1/2004 | Aizawa et al. | |
| 2004/0039503 | A1 | 2/2004 | Doyle | |
| 2004/0054452 | A1 | 3/2004 | Bjorkman | |
| 2004/0077285 | A1 | 4/2004 | Bonilla et al. | |
| 2004/0085198 | A1 | 5/2004 | Saito et al. | |
| 2004/0090334 | A1 | 5/2004 | Zhang et al. | |
| 2004/0111301 | A1 | 6/2004 | Wahlbin et al. | |
| 2004/0122639 | A1 | 6/2004 | Qiu | |
| 2004/0139034 | A1 | 7/2004 | Farmer | |
| 2004/0153362 | A1 | 8/2004 | Bauer et al. | |
| 2004/0158476 | A1 | 8/2004 | Blessinger et al. | |
| 2004/0198441 | A1 | 10/2004 | Cooper et al. | |
| 2004/0226043 | A1 | 11/2004 | Mettu et al. | |
| 2004/0260579 | A1 | 12/2004 | Tremiti | |
| 2005/0071202 | A1 | 3/2005 | Kendrick | |
| 2005/0073438 | A1 | 4/2005 | Rodgers et al. | |
| 2005/0108910 | A1 | 5/2005 | Esparza et al. | |
| 2005/0131597 | A1 | 6/2005 | Raz et al. | |
| 2005/0228763 | A1 | 10/2005 | Lewis et al. | |
| 2005/0259151 | A1 | 11/2005 | Hamilton et al. | |
| 2005/0267784 | A1 | 12/2005 | Slen et al. | |
| 2006/0031103 | A1 | 2/2006 | Henry | |
| 2006/0052909 | A1 | 3/2006 | Cherouny | |
| 2006/0053038 | A1 | 3/2006 | Warren et al. | |
| 2006/0079280 | A1 | 4/2006 | LaPerch | |
| 2006/0092043 | A1 | 5/2006 | Lagassey | |
| 2006/0095302 | A1 * | 5/2006 | Vahidi | G06Q 10/10 705/4 |
| 2006/0136291 | A1 | 6/2006 | Morita et al. | |
| 2006/0184295 | A1 | 8/2006 | Hawkins et al. | |
| 2006/0212195 | A1 | 9/2006 | Veith et al. | |
| 2006/0220905 | A1 | 10/2006 | Hovestadt | |
| 2006/0229777 | A1 | 10/2006 | Hudson et al. | |
| 2006/0232430 | A1 | 10/2006 | Takaoka et al. | |
| 2006/0244746 | A1 * | 11/2006 | England | G06T 11/60 345/419 |
| 2007/0001831 | A1 | 1/2007 | Raz et al. | |
| 2007/0027726 | A1 | 2/2007 | Warren et al. | |
| 2007/0055422 | A1 | 3/2007 | Anzai et al. | |
| 2007/0080816 | A1 | 4/2007 | Haque et al. | |
| 2007/0088469 | A1 | 4/2007 | Schmiedel et al. | |
| 2007/0122771 | A1 | 5/2007 | Maeda et al. | |
| 2007/0132773 | A1 | 6/2007 | Plante | |
| 2007/0149208 | A1 | 6/2007 | Syrbe et al. | |
| 2007/0159344 | A1 | 7/2007 | Kisacanin | |
| 2007/0219720 | A1 | 9/2007 | Trepagnier et al. | |
| 2007/0282638 | A1 | 12/2007 | Surovy | |
| 2007/0291130 | A1 | 12/2007 | Broggi et al. | |
| 2007/0299700 | A1 | 12/2007 | Gay et al. | |
| 2008/0027761 | A1 | 1/2008 | Bracha | |
| 2008/0052134 | A1 | 2/2008 | Nowak et al. | |
| 2008/0061953 | A1 | 3/2008 | Bhogal et al. | |
| 2008/0064014 | A1 | 3/2008 | Wojtczak et al. | |
| 2008/0065427 | A1 | 3/2008 | Helitzer et al. | |
| 2008/0082372 | A1 | 4/2008 | Burch | |
| 2008/0084473 | A1 | 4/2008 | Romanowich | |
| 2008/0106390 | A1 | 5/2008 | White | |
| 2008/0111666 | A1 | 5/2008 | Plante et al. | |
| 2008/0114502 | A1 | 5/2008 | Breed et al. | |
| 2008/0126137 | A1 | 5/2008 | Kidd et al. | |
| 2008/0143497 | A1 | 6/2008 | Wasson et al. | |
| 2008/0147266 | A1 | 6/2008 | Plante et al. | |
| 2008/0147267 | A1 | 6/2008 | Plante et al. | |
| 2008/0180237 | A1 | 7/2008 | Fayyad et al. | |
| 2008/0189142 | A1 | 8/2008 | Brown et al. | |
| 2008/0195457 | A1 | 8/2008 | Sherman et al. | |
| 2008/0204256 | A1 | 8/2008 | Omi | |
| 2008/0255887 | A1 | 10/2008 | Gruter | |
| 2008/0255888 | A1 | 10/2008 | Berkobin et al. | |
| 2008/0258890 | A1 | 10/2008 | Follmer et al. | |
| 2008/0291008 | A1 | 11/2008 | Jeon | |
| 2008/0297488 | A1 | 12/2008 | Operowsky et al. | |
| 2008/0319665 | A1 | 12/2008 | Berkobin et al. | |
| 2009/0015684 | A1 | 1/2009 | Ooga et al. | |
| 2009/0063030 | A1 | 3/2009 | Howarter et al. | |
| 2009/0069953 | A1 | 3/2009 | Hale et al. | |
| 2009/0079839 | A1 | 3/2009 | Fischer et al. | |
| 2009/0115638 | A1 | 5/2009 | Shankwitz et al. | |
| 2009/0132294 | A1 | 5/2009 | Haines | |
| 2009/0207005 | A1 | 8/2009 | Habetha et al. | |
| 2009/0210257 | A1 | 8/2009 | Chalfant et al. | |
| 2009/0267801 | A1 | 10/2009 | Kawai et al. | |
| 2009/0300065 | A1 | 12/2009 | Birchall | |
| 2009/0303026 | A1 | 12/2009 | Broggi et al. | |
| 2010/0004995 | A1 | 1/2010 | Hickman | |
| 2010/0030540 | A1 * | 2/2010 | Choi | G01S 5/0027 703/8 |
| 2010/0030586 | A1 | 2/2010 | Taylor et al. | |
| 2010/0055649 | A1 | 3/2010 | Takahashi et al. | |
| 2010/0076646 | A1 | 3/2010 | Basir et al. | |
| 2010/0106356 | A1 | 4/2010 | Trepagnier et al. | |
| 2010/0128127 | A1 | 5/2010 | Ciolli | |
| 2010/0131300 | A1 | 5/2010 | Collopy et al. | |
| 2010/0131302 | A1 | 5/2010 | Collopy et al. | |
| 2010/0131304 | A1 | 5/2010 | Collopy et al. | |
| 2010/0131307 | A1 | 5/2010 | Collopy et al. | |
| 2010/0157061 | A1 * | 6/2010 | Katsman | G07C 5/008 348/149 |

(56) References Cited

U.S. PATENT DOCUMENTS

2010/0214087 A1 8/2010 Nakagoshi et al.
2010/0219944 A1 9/2010 McCormick et al.
2010/0293033 A1 11/2010 Hall et al.
2010/0299021 A1 11/2010 Jalili
2011/0054767 A1 3/2011 Schafer et al.
2011/0060496 A1 3/2011 Nielsen et al.
2011/0066310 A1 3/2011 Sakai et al.
2011/0087505 A1 4/2011 Terlep
2011/0090075 A1 4/2011 Armitage et al.
2011/0090093 A1 4/2011 Grimm et al.
2011/0093350 A1 4/2011 Laumeyer et al.
2011/0106370 A1 5/2011 Duddle et al.
2011/0133954 A1 6/2011 Ooshima et al.
2011/0137684 A1 6/2011 Peak et al.
2011/0140968 A1 6/2011 Bai et al.
2011/0153367 A1 6/2011 Amigo et al.
2011/0169625 A1 7/2011 James et al.
2011/0184605 A1 7/2011 Neff
2011/0196571 A1 8/2011 Foladare et al.
2011/0202305 A1 8/2011 Willis et al.
2011/0295446 A1 12/2011 Basir et al.
2011/0301839 A1 12/2011 Pudar et al.
2011/0304465 A1 12/2011 Boult et al.
2011/0307188 A1 12/2011 Peng et al.
2011/0307336 A1 12/2011 Smirnov et al.
2012/0004933 A1 1/2012 Foladare et al.
2012/0010906 A1 1/2012 Foladare et al.
2012/0025969 A1 2/2012 Dozza
2012/0028680 A1 2/2012 Breed
2012/0066007 A1 3/2012 Ferrick et al.
2012/0071151 A1 3/2012 Abramson et al.
2012/0072243 A1 3/2012 Collins et al.
2012/0072244 A1 3/2012 Collins et al.
2012/0083668 A1 4/2012 Pradeep et al.
2012/0083960 A1 4/2012 Zhu et al.
2012/0083974 A1 4/2012 Sandblom
2012/0092157 A1 4/2012 Tran
2012/0101855 A1 4/2012 Collins et al.
2012/0108909 A1 5/2012 Slobounov et al.
2012/0109407 A1 5/2012 Yousefi et al.
2012/0109692 A1 5/2012 Collins et al.
2012/0123806 A1 5/2012 Schumann, Jr. et al.
2012/0135382 A1 5/2012 Winston et al.
2012/0143630 A1 6/2012 Hertenstein
2012/0172055 A1 7/2012 Edge
2012/0185204 A1 7/2012 Jallon et al.
2012/0190001 A1 7/2012 Knight et al.
2012/0191343 A1 7/2012 Haleem
2012/0197669 A1 8/2012 Kote et al.
2012/0209634 A1 8/2012 Ling et al.
2012/0215375 A1 8/2012 Chang
2012/0235865 A1 9/2012 Nath et al.
2012/0239471 A1 9/2012 Grimm et al.
2012/0246733 A1 9/2012 Schafer et al.
2012/0258702 A1 10/2012 Matsuyama
2012/0277950 A1 11/2012 Plante et al.
2012/0316406 A1 12/2012 Rahman et al.
2013/0006674 A1 1/2013 Bowne et al.
2013/0006675 A1 1/2013 Bowne et al.
2013/0018677 A1 1/2013 Chevrette
2013/0030642 A1* 1/2013 Bradley ................. G07C 5/008 701/32.2
2013/0038437 A1 2/2013 Talati et al.
2013/0044008 A1 2/2013 Gafford et al.
2013/0046562 A1 2/2013 Taylor et al.
2013/0073115 A1 3/2013 Levin et al.
2013/0073318 A1* 3/2013 Feldman ................ G06Q 40/08 705/4
2013/0116855 A1 5/2013 Nielsen et al.
2013/0144459 A1 6/2013 Ricci
2013/0151202 A1 6/2013 Denny et al.
2013/0164715 A1 6/2013 Hunt et al.
2013/0179198 A1 7/2013 Bowne et al.
2013/0189649 A1 7/2013 Mannino
2013/0209968 A1 8/2013 Miller et al.
2013/0218603 A1 8/2013 Hagelstein et al.
2013/0218604 A1 8/2013 Hagelstein et al.
2013/0227409 A1 8/2013 Das et al.
2013/0245881 A1 9/2013 Scarbrough
2013/0267194 A1 10/2013 Breed
2013/0289819 A1 10/2013 Hassib et al.
2013/0302758 A1 11/2013 Wright
2013/0304513 A1 11/2013 Hyde et al.
2013/0304514 A1 11/2013 Hyde et al.
2013/0307786 A1 11/2013 Heubel
2013/0317693 A1 11/2013 Jefferies et al.
2013/0317711 A1 11/2013 Plante
2013/0317865 A1 11/2013 Tofte et al.
2013/0332402 A1 12/2013 Rakshit
2013/0339062 A1 12/2013 Brewer et al.
2014/0002651 A1 1/2014 Plante
2014/0009307 A1 1/2014 Bowers et al.
2014/0012492 A1 1/2014 Bowers et al.
2014/0039934 A1 2/2014 Rivera
2014/0047347 A1 2/2014 Mohn et al.
2014/0047371 A1 2/2014 Palmer et al.
2014/0052323 A1 2/2014 Reichel et al.
2014/0058761 A1 2/2014 Freiberger et al.
2014/0059066 A1 2/2014 Koloskov
2014/0070980 A1 3/2014 Park
2014/0080100 A1 3/2014 Phelan et al.
2014/0095214 A1 4/2014 Mathe et al.
2014/0099607 A1 4/2014 Armitage et al.
2014/0100892 A1 4/2014 Collopy et al.
2014/0106782 A1 4/2014 Chitre et al.
2014/0108198 A1 4/2014 Jariyasunant et al.
2014/0111647 A1 4/2014 Atsmon et al.
2014/0114691 A1 4/2014 Pearce
2014/0125474 A1 5/2014 Gunaratne
2014/0129139 A1* 5/2014 Ellison ............... G01C 21/3469 701/533
2014/0167967 A1 6/2014 He et al.
2014/0168399 A1 6/2014 Plummer et al.
2014/0172467 A1 6/2014 He et al.
2014/0172727 A1 6/2014 Abhyanker et al.
2014/0191858 A1 7/2014 Morgan et al.
2014/0218187 A1 8/2014 Chun et al.
2014/0236638 A1 8/2014 Pallesen et al.
2014/0240132 A1 8/2014 Bychkov
2014/0253376 A1 9/2014 Large et al.
2014/0257866 A1 9/2014 Gay et al.
2014/0272810 A1 9/2014 Fields et al.
2014/0277916 A1 9/2014 Mullen et al.
2014/0278840 A1 9/2014 Scofield et al.
2014/0279707 A1 9/2014 Joshua et al.
2014/0301218 A1 10/2014 Luo et al.
2014/0309864 A1 10/2014 Ricci
2014/0310186 A1 10/2014 Ricci
2014/0335902 A1* 11/2014 Guba ................... H04W 4/027 455/456.4
2014/0358324 A1 12/2014 Sagar et al.
2015/0024705 A1 1/2015 Rashidi
2015/0039350 A1 2/2015 Martin et al.
2015/0051752 A1 2/2015 Paszkowicz
2015/0058046 A1* 2/2015 Huynh .................. G06Q 40/08 705/4
2015/0070265 A1 3/2015 Cruz-Hernandez et al.
2015/0088334 A1 3/2015 Bowers et al.
2015/0088373 A1 3/2015 Wilkins
2015/0088550 A1 3/2015 Bowers et al.
2015/0112504 A1 4/2015 Binion et al.
2015/0112543 A1 4/2015 Binion et al.
2015/0112545 A1 4/2015 Binion et al.
2015/0112730 A1 4/2015 Binion et al.
2015/0112731 A1 4/2015 Binion et al.
2015/0112800 A1 4/2015 Binion et al.
2015/0120331 A1 4/2015 Russo et al.
2015/0127570 A1 5/2015 Doughty et al.
2015/0142262 A1 5/2015 Lee
2015/0158469 A1 6/2015 Cheatham, III et al.
2015/0158495 A1 6/2015 Duncan et al.
2015/0160653 A1 6/2015 Cheatham, III et al.
2015/0161893 A1 6/2015 Duncan et al.
2015/0161894 A1 6/2015 Duncan et al.

(56) References Cited

U.S. PATENT DOCUMENTS

| | | | |
|---|---|---|---|
| 2015/0170287 A1 | 6/2015 | Tirone et al. | |
| 2015/0178998 A1 | 6/2015 | Attard et al. | |
| 2015/0185034 A1 | 7/2015 | Abhyanker | |
| 2015/0187013 A1 | 7/2015 | Adams et al. | |
| 2015/0187015 A1 | 7/2015 | Adams et al. | |
| 2015/0187016 A1 | 7/2015 | Adams et al. | |
| 2015/0193219 A1 | 7/2015 | Pandya et al. | |
| 2015/0235557 A1 | 8/2015 | Engelman et al. | |
| 2015/0242953 A1 | 8/2015 | Suiter | |
| 2015/0254955 A1 | 9/2015 | Fields et al. | |
| 2015/0294422 A1 | 10/2015 | Carver et al. | |
| 2015/0339777 A1* | 11/2015 | Zhalov | G06Q 40/08 705/4 |
| 2015/0348337 A1 | 12/2015 | Choi | |
| 2016/0027276 A1 | 1/2016 | Freeck et al. | |
| 2016/0036899 A1 | 2/2016 | Moody et al. | |
| 2016/0086285 A1 | 3/2016 | Jordan Peters et al. | |
| 2016/0092962 A1 | 3/2016 | Wasserman et al. | |
| 2016/0093212 A1 | 3/2016 | Barfield, Jr. et al. | |
| 2016/0105365 A1 | 4/2016 | Droste et al. | |
| 2016/0277911 A1 | 9/2016 | Kang et al. | |

FOREIGN PATENT DOCUMENTS

| | | | |
|---|---|---|---|
| GB | 2494727 | A | 3/2013 |
| JP | 2002-259708 | A | 9/2002 |
| WO | WO-2005/083605 | A1 | 9/2005 |
| WO | WO-2010/034909 | A1 | 4/2010 |
| WO | WO-2014/139821 | A1 | 9/2014 |
| WO | WO-2014/148976 | A1 | 9/2014 |
| WO | WO-2016/156236 | A1 | 10/2016 |

OTHER PUBLICATIONS

"Integrated Vehicle-Based Safety Systems (IVBSS)", Research and Innovative Technology Administration (RITA), http://www.its.dot.gov/ivbss/, retrieved from the internet on Nov. 4, 2013, 3 pages.
Advisory Action dated Apr. 1, 2015 for U.S. Appl. No. 14/269,490, 4 pgs.
Carroll et al. "Where Innovation is Sorely Needed", http://www.technologyreview.com/news/422568/where-innovation-is-sorely-needed/?nlid, retrieved from the internet on Nov. 4, 2013, 3 pages.
Davies, Avoiding Squirrels and Other Things Google's Robot Car Can't Do, downloaded from the Internet at: <http://www.wired.com/2014/05/google-self-driving-car-can-cant/ (downloaded on May 28, 2014).
Fields et al., U.S. Appl. No. 14/511,712, filed Oct. 10, 2014.
Fields et al., U.S. Appl. No. 14/511,750, filed Oct. 10, 2014.
Final Office Action, U.S. Appl. No. 14/255,934, dated Sep. 23, 2014.
Final Office Action, U.S. Appl. No. 14/269,490, dated Jan. 23, 2015.
Hancock, G.M., P.A. Hancock, and C.M. Janelle, "The Impact of Emotions and Predominant Emotion Regulation Technique on Driving Performance," pp. 5882-5885, 2012.
Levendusky, Advancements in automotive technology and their effect on personal auto insurance, downloaded from the Internet at: <http://www.verisk.com/visualize/advancements-in-automotive-technology-and-their-effect> (2013).
McCraty, R., B. Barrios-Choplin, M. Atkinson, and D. Tomasino. "The Effects of Different Types of Music on Mood, Tension, and Mental Clarity." Alternative Therapies in Health and Medicine 4.1 (1998): 75-84. NCBI PubMed. Web. Jul. 11, 2013.
Mui, Will auto insurers survive their collision with driverless cars? (Part 6), downloaded from the Internet at: <http://www.forbes.com/sites/chunkamui/2013/03/28/will-auto-insurers-survive-their-collision> (Mar. 28, 2013).
Nonfinal Office Action, U.S. Appl. No. 14/255,934, dated Jan. 15, 2015.
Nonfinal Office Action, U.S. Appl. No. 14/255,934, dated Jun. 18, 2014.
Nonfinal Office Action, U.S. Appl. No. 14/269,490, dated Sep. 12, 2014.
Notice of Allowance in U.S. Appl. No. 14/057,408 dated Sep. 25, 2014.
Notice of Allowance in U.S. Appl. No. 14/057,419 dated Oct. 5, 2015.
Notice of Allowance in U.S. Appl. No. 14/208,626 dated May 11, 2015.
Notice of Allowance in U.S. Appl. No. 14/208,626 dated Sep. 1, 2015.
Notice of Allowance in U.S. Appl. No. 14/255,934 dated May 27, 2015.
Notice of Allowance in U.S. Appl. No. 14/729,290 dated Aug. 5, 2015.
Office Action dated Dec. 26, 2014 for U.S. Appl. No. 14/511,712, 21 pgs.
Office Action in U.S. Appl. No. 13/844,090 dated Dec. 4, 2013.
Office Action in U.S. Appl. No. 14/057,419 dated Mar. 31, 2015.
Office Action in U.S. Appl. No. 14/057,419 dated Oct. 9, 2014.
Office Action in U.S. Appl. No. 14/057,456 dated Mar. 17, 2015.
Office Action in U.S. Appl. No. 14/201,491 dated Apr. 29, 2015.
Office Action in U.S. Appl. No. 14/201,491 dated Jan. 16, 2015.
Office Action in U.S. Appl. No. 14/201,491 dated Sep. 11, 2015.
Office Action in U.S. Appl. No. 14/201,491 dated Sep. 26, 2014.
Office Action in U.S. Appl. No. 14/215,789 dated Sep. 17, 2015.
Office Action in U.S. Appl. No. 14/255,934 dated Jan. 15, 2015.
Office Action in U.S. Appl. No. 14/255,934 dated Jun. 18, 2014.
Office Action in U.S. Appl. No. 14/255,934 dated Sep. 23, 2014.
Office Action in U.S. Appl. No. 14/269,490 dated Jan. 23, 2015.
Office Action in U.S. Appl. No. 14/269,490 dated Jun. 11, 2015.
Office Action in U.S. Appl. No. 14/269,490 dated Sep. 12, 2014.
Office Action in U.S. Appl. No. 14/511,712 dated Jun. 25, 2015.
Office Action in U.S. Appl. No. 14/511,712 dated Oct. 10, 2014.
Office Action in U.S. Appl. No. 14/511,750 dated Dec. 19, 2014.
Office Action in U.S. Appl. No. 14/511,750 dated Jun. 30, 2015.
Office Action in U.S. Appl. No. 14/057,408 dated Jan. 28, 2014.
Office Action in U.S. Appl. No. 14/057,408 dated May 22, 2014.
Office Action in U.S. Appl. No. 14/057,419 dated Jan. 28, 2014.
Office Action in U.S. Appl. No. 14/057,419 dated Jun. 18, 2014.
Office Action in U.S. Appl. No. 14/057,435 dated Jul. 23, 2014.
Office Action in U.S. Appl. No. 14/057,435 dated Mar. 20, 2014.
Office Action in U.S. Appl. No. 14/057,435 dated May 29, 2015.
Office Action in U.S. Appl. No. 14/057,435 dated Nov. 18, 2014.
Office Action in U.S. Appl. No. 14/057,447 dated Aug. 28, 2014.
Office Action in U.S. Appl. No. 14/057,447 dated Dec. 18, 2014.
Office Action in U.S. Appl. No. 14/057,447 dated Feb. 24, 2014.
Office Action in U.S. Appl. No. 14/057,447 dated Jul. 6, 2015.
Office Action in U.S. Appl. No. 14/057,456 dated Mar. 14, 2014.
Office Action in U.S. Appl. No. 14/057,456 dated Oct. 28, 2014.
Office Action in U.S. Appl. No. 14/057,467 dated Feb. 23, 2015.
Office Action in U.S. Appl. No. 14/057,467 dated Jan. 27, 2014.
Office Action in U.S. Appl. No. 14/057,467 dated Jun. 11, 2014.
Office Action in U.S. Appl. No. 14/057,467 dated Oct. 17, 2014.
Office Action in U.S. Appl. No. 14/208,626 dated Apr. 29, 2014.
Office Action in U.S. Appl. No. 14/208,626 dated Aug. 13, 2014.
Office Action in U.S. Appl. No. 14/208,626 dated Dec. 23, 2014.
Office Action in U.S. Appl. No. 14/339,652 dated May 15, 2015.
Office Action in U.S. Appl. No. 14/339,652 dated Oct. 23, 2014.
Office Action in U.S. Appl. No. 14/339,652 dated Sep. 24, 2015.
Office Action in U.S. Appl. No. 14/528,424 dated Feb. 27, 2015.
Office Action in U.S. Appl. No. 14/528,424 dated Jul. 30, 2015.
Office Action in U.S. Appl. No. 14/528,642 dated Jan. 13, 2015.
Office Action in U.S. Appl. No. 14/713,230 dated Oct. 9, 2015.
Office Action in U.S. Appl. No. 14/713,254 dated Oct. 9, 2015.
Office Action in U.S. Appl. No. 14/718,338 dated Jul. 7, 2015.
Office Action, U.S. Appl. No. 14/713,261, dated Oct. 21, 2015.
Read, Autonomous cars & the death of auto insurance, downloaded from the Internet at: <http://www.thecarconnection.com/news/1083266_autonomous-cars-the-death-of-auto-insurance> (Apr. 1, 2013).
Riley et al., U.S. Appl. No. 14/269,490, filed May 5, 2014.
Ryan, Can having safety features reduce your insurance premiums? (Dec. 15, 2010).

(56) References Cited

OTHER PUBLICATIONS

Search Report in EP Application No. 13167206.5 dated Aug. 13, 2013, 6 pages.
Sharma, Driving the future: the legal implications of autonomous vehicles conference recap, downloaded from the Internet at: <http://law.scu.edu/hightech/autonomousvehicleconfrecap2012> (2012).
Stienstra, Autonomous Vehicles & the Insurance Industry, 2013 CAS Annual Meeting—Minneapolis, MN (2013).
U.S. Appl. No. 14/215,789, filed Mar. 17, 2014, Baker et al., "Split Sensing Method".
U.S. Appl. No. 14/339,652, filed Jul. 24, 2014, Freeck et al., "System and Methods for Monitoring a Vehicle Operator and Monitoring an Operating Environment Within the Vehicle".
U.S. Appl. No. 14/528,424, filed Oct. 30, 2014, Christensen et al., "Systems and Methods for Processing Trip-Based Insurance Policies".
U.S. Appl. No. 14/528,642, filed Oct. 30, 2014, Christensen et al., "Systems and Methods for Managing Units Associated with Time-Based Insurance Policies".
U.S. Appl. No. 14/713,184, filed May 15, 2015, Konrardy et al., "Autonomous Vehicle Insurance Pricing".
U.S. Appl. No. 14/713,188, filed May 15, 2015, Konrardy et al., "Autonomous Feature Use Monitoring and Insurance Pricing".
U.S. Appl. No. 14/713,194, filed May 15, 2015, Konrardy et al., "Autonomous Communication Feature Use and Insurance Pricing".
U.S. Appl. No. 14/713,201, filed May 15, 2015, Konrardy et al., "Autonomous Vehicle Insurance Pricing and Offering Based Upon Accident Risk Factors".
U.S. Appl. No. 14/713,206, filed May 15, 2015, Konrardy et al., "Determining Autonomous Vehicle Technology Performance for Insurance Pricing and Offering".
U.S. Appl. No. 14/713,214, filed May 15, 2015, Konrardy et al., "Accident Risk Model Determination Using Autonomous Vehicle Operating Data".
U.S. Appl. No. 14/713,217, filed May 15, 2015, Konrardy et al., "Autonomous Vehicle Operation Feature Usage Recommendations".
U.S. Appl. No. 14/713,223, filed May 15, 2015, Konrardy et al., "Driver Feedback Alerts Based Upon Monitoring Use of Autonomous Vehicle Operation Features".
U.S. Appl. No. 14/713,226, filed May 15, 2015, Konrardy et al. "Accident Response Using Autonomous Vehicle Monitoring".
U.S. Appl. No. 14/713,230, filed May 15, 2015, Konrardy et al. "Accident Fault Determination for Autonomous Vehicles".
U.S. Appl. No. 14/713,237, filed May 15, 2015, Konrardy et al. "Autonomous Vehicle Technology Effectiveness Determination for Insurance Pricing".
U.S. Appl. No. 14/713,240, filed May 15, 2015, Konrardy et al. "Fault Determination with Autonomous Feature Use Monitoring".
U.S. Appl. No. 14/713,244, filed May 15, 2015, Konrardy et al. "Autonomous Vehicle Operation Feature Evaulation".
U.S. Appl. No. 14/713,249, filed May 15, 2015, Konrardy et al. "Autonomous Vehicle Operation Feature Monitoring and Evaluation of Effectiveness".
U.S. Appl. No. 14/713,254, filed May 15, 2015, Konrardy et al. "Accident Fault Determination for Autonomous Vehicles".
U.S. Appl. No. 14/713,261, filed May 15, 2015, Konrardy et al. "Accident Fault Determination for Autonomous Vehicles".
U.S. Appl. No. 14/713,266, filed May 15, 2015, Konrardy et al. "Autonomous Vehicle Operation Feature Monitoring and Evaluation of Effectiveness".
U.S. Appl. No. 14/713,271, filed May 15, 2015, Konrardy et al. "Fully Autonomous Vehicle Insurance Pricing".
U.S. Appl. No. 14/729,290, filed Jun. 3, 2015, Fields et al., "Advanced Vehicle Operator Intelligence System".
U.S. Appl. No. 14/857,242, filed Sep. 17, 2015, Fields et al., "Advanced Vehicle Operator Intelligence System".
Wiesenthal, David L., Dwight A. Hennessy, and Brad Totten, "The Influence of Music on Driver Stress," Journal of Applied Social Psychology 30, 8, pp. 1709-1719, 2000.
Young et al., "Cooperative Collision Warning Based Highway Vehicle Accident Reconstruction", Eighth International Conference on Intelligent Systems Design and Applications, Nov. 26-28, 2008, pp. 561-565.
"Linking Driving Behavior to Automobile Accidents and Insurance Rates: An Analysis of Five Billion Miles Driven", Progressive Insurance brochure (Jul. 2012).
"Self-Driving Cars: The Next Revolution", KPMG, Center for Automotive Research (2012).
The Influence of Telematics on Customer Experience: Case Study of Progressive's Snapshot Program, J.D. Power Insights, McGraw Hill Financial (2013).
Alberi et al., A proposed standardized testing procedure for autonomous ground vehicles, Virginia Polytechnic Institute and State University, 63 pages (Apr. 29, 2008).
Broggi et al., Extensive Tests of Autonomous Driving Technologies, IEEE Trans on Intelligent Transportation Systems, 14(3):1403-15 (May 30, 2013).
Campbell et al., Autonomous Driving in Urban Environments: Approaches, Lessons, and Challenges, Phil. Trans. R. Soc. A, 368:4649-72 (2010).
Figueiredo et al., An Approach to Simulate Autonomous Vehicles in Urban Traffic Scenarios, University of Porto, 7 pages (Nov. 2009).
Gechter et al., Towards a Hybrid Real/Virtual Simulation of Autonomous Vehicles for Critical Scenarios, International Academy Research and Industry Association (IARIA), 4 pages (2014).
Hars, Autonomous Cars: The Next Revolution Looms, Inventivio GmbH, 4 pages (Jan. 2010).
Lee et al., Autonomous Vehicle Simulation Project, Int. J. Software Eng. and Its Applications, 7(5):393-402 (2013).
Miller, A simulation and regression testing framework for autonomous workers, Case Western Reserve University, 12 pages (Aug. 2007).
Pereira, An Integrated Architecture for Autonomous Vehicle Simulation, University of Porto., 114 pages (Jun. 2011).
Quinlan et al., Bringing Simulation to Life: A Mixed Reality Autonomous Intersection, Proc. IROS 2010—IEEE/RSJ International Conference on Intelligent Robots and Systems, Taipei Taiwan, 6 pages (Oct. 2010).
Reddy, The New Auto Insurance Ecosystem: Telematics, Mobility and the Connected Car, Cognizant (Aug. 2012).
Reifel et al., "Telematics: The Game Changer—Reinventing Auto Insurance", A.T. Kearney (2010).
Roberts, "What is Telematics Insurance?", MoneySupermarket (Jun. 20, 2012).
Stavens, Learning to Drive: Perception for Autonomous Cars, Stanford University, 104 pages (May 2011).
U.S. Appl. No. 13/844,090, Notice of Allowance, dated Jul. 8, 2014.
U.S. Appl. No. 13/844,090, Office Action, dated Dec. 4, 2013.
U.S. Appl. No. 14/057,408, Notice of Allowance, dated Sep. 25, 2014.
U.S. Appl. No. 14/057,419, Notice of Allowance, dated Oct. 5, 2015.
U.S. Appl. No. 14/057,435, Notice of Allowance, dated Apr. 1, 2016.
U.S. Appl. No. 14/057,447, Final Office Action, dated Jun. 20, 2016.
U.S. Appl. No. 14/057,447, Nonfinal Office Action, dated Dec. 11, 2015.
U.S. Appl. No. 14/057,447, Nonfinal Office Action, dated Sep. 28, 2016.
U.S. Appl. No. 14/057,456, Final Office Action, dated Jun. 16, 2016.
U.S. Appl. No. 14/057,456, Final Office Action, dated Mar. 17, 2015.
U.S. Appl. No. 14/057,456, Nonfinal Office Action, dated Dec. 3, 2015.
U.S. Appl. No. 14/057,456, Nonfinal Office Action, dated Mar. 9, 2017.
U.S. Appl. No. 14/057,467, Final Office Action, dated Dec. 7, 2016.
U.S. Appl. No. 14/057,467, Final Office Action, dated Mar. 16, 2016.
U.S. Appl. No. 14/057,467, Nonfinal Office Action, dated Jul. 1, 2016.
U.S. Appl. No. 14/057,467, Nonfinal Office Action, Nov. 12, 2015.

(56) References Cited

OTHER PUBLICATIONS

U.S. Appl. No. 14/201,491, Final Office Action, dated Sep. 11, 2015.
U.S. Appl. No. 14/208,626, Notice of Allowance, dated May 11, 2015.
U.S. Appl. No. 14/208,626, Notice of Allowance, dated Sep. 1, 2015.
U.S. Appl. No. 14/215,789, Final Office Action, dated Mar. 11, 2016.
U.S. Appl. No. 14/255,934, Nonfinal Office Action, dated Jan. 15, 2015.
U.S. Appl. No. 14/255,934, Nonfinal Office Action, dated Jun. 18, 2014.
U.S. Appl. No. 14/255,934, Notice of Allowance, dated May 27, 2015.
U.S. Appl. No. 14/269,490, Nonfinal Office Action, dated Sep. 12, 2014.
U.S. Appl. No. 14/269,490, Notice of Allowance, dated Nov. 17, 2015.
U.S. Appl. No. 14/339,652, Final Office Action, dated Apr. 22, 2016.
U.S. Appl. No. 14/339,652, Nonfinal Office Action, dated Sep. 24, 2015.
U.S. Appl. No. 14/511,712, Final Office Action, dated Jun. 25, 2015.
U.S. Appl. No. 14/511,712, Notice of Allowance, dated Oct. 22, 2015.
U.S. Appl. No. 14/511,712, Office Action, Dec. 26, 2014.
U.S. Appl. No. 14/511,750, Nonfinal Office Action, dated Nov. 3, 2015.
U.S. Appl. No. 14/511,750, Notice of Allowance, dated Mar. 4, 2016.
U.S. Appl. No. 14/528,424, Final Office Action, dated Apr. 22, 2016.
U.S. Appl. No. 14/528,424, Nonfinal Office Action, dated Dec. 3, 2015.
U.S. Appl. No. 14/528,642, Final Office Action, dated Mar. 9, 2016.
U.S. Appl. No. 14/713,184, Final Office Action, dated Jul. 15, 2016.
U.S. Appl. No. 14/713,184, Nonfinal office action, dated Mar. 10, 2017.
U.S. Appl. No. 14/713,184, Nonfinal Office Action, mailed Feb. 1, 2016.
U.S. Appl. No. 14/713,188, Final Office Action, dated May 31, 2016.
U.S. Appl. No. 14/713,188, Nonfinal Office Action, mailed Dec. 3, 2015.
U.S. Appl. No. 14/713,188, Nonfinal Office Action, dated Feb. 24, 2017.
U.S. Appl. No. 14/713,194, Final Office Action, dated Jan. 25, 2017.
U.S. Appl. No. 14/713,194, Nonfinal Office Action, dated Jul. 29, 2016.
U.S. Appl. No. 14/713,201, Final Office Action, dated Sep. 27, 2016.
U.S. Appl. No. 14/713,201, Nonfinal Office Action, dated May 19, 2016.
U.S. Appl. No. 14/713,206, Final Office Action, dated May 13, 2016.
U.S. Appl. No. 14/713,206, Nonfinal Office Action, dated Feb. 13, 2017.
U.S. Appl. No. 14/713,206, Nonfinal Office Action, dated Nov. 20, 2015.
U.S. Appl. No. 14/713,214, Final Office Action, dated Aug. 26, 2016.
U.S. Appl. No. 14/713,214, Nonfinal Office Action, dated Feb. 26, 2016.
U.S. Appl. No. 14/713,217, Final Office Action, dated Jul. 22, 2016.
U.S. Appl. No. 14/713,217, Nonfinal Office Action, dated Mar. 10, 2017.
U.S. Appl. No. 14/713,217, Nonfinal Office Action, dated Feb. 12, 2016.
U.S. Appl. No. 14/713,223, Final Office Action, dated Sep. 1, 2016.
U.S. Appl. No. 14/713,223, Nonfinal Office Action, dated Feb. 26, 2016.
U.S. Appl. No. 14/713,226, Final Office Action, dated May 26, 2016.
U.S. Appl. No. 14/713,226, Nonfinal Office Action, dated Jan. 13, 2016.
U.S. Appl. No. 14/713,226, Notice of Allowance, dated Sep. 22, 2016.
U.S. Appl. No. 14/713,226, Second Notice of Allowance, dated Jan. 12, 2017.
U.S. Appl. No. 14/713,230, Final Office Action, dated Mar. 22, 2016.
U.S. Appl. No. 14/713,230, Nonfinal Office Action, dated Feb. 10, 2017.
U.S. Appl. No. 14/713,237, Final Office Action, dated Sep. 9, 2016.
U.S. Appl. No. 14/713,237, Nonfinal Office Action, dated Apr. 18, 2016.
U.S. Appl. No. 14/713,240, Final Office Action, dated Sep. 12, 2016.
U.S. Appl. No. 14/713,240, Nonfinal Office Action, dated Apr. 7, 2016.
U.S. Appl. No. 14/713,249, Final Office Action, dated Jul. 12, 2016.
U.S. Appl. No. 14/713,249, Nonfinal Office Action, dated Mar. 7, 2017.
U.S. Appl. No. 14/713,249, Nonfinal Office Action, dated Jan. 20, 2016.
U.S. Appl. No. 14/713,254, Final Office Action, dated Mar. 16, 2016.
U.S. Appl. No. 14/713,254, Nonfinal Office Action, dated Jan. 30, 2017.
U.S. Appl. No. 14/713,261, Final Office Action, dated Apr. 1, 2016.
U.S. Appl. No. 14/713,261, Nonfinal Office Action, dated Feb. 23, 2017.
U.S. Appl. No. 14/713,266, Final Office Action, dated Sep. 12, 2016.
U.S. Appl. No. 14/713,266, Nonfinal Office Action, dated Mar. 23, 2016.
U.S. Appl. No. 14/713,271, Final Office Action, dated Jun. 17, 2016.
U.S. Appl. No. 14/713,271, Nonfinal Office Action, dated Feb. 28, 2017.
U.S. Appl. No. 14/713,271, Nonfinal Office Action, dated Nov. 6, 2015.
U.S. Appl. No. 14/718,338, Notice of Allowance, dated Nov. 2, 2015.
U.S. Appl. No. 14/729,290, Notice of Allowance, dated Aug. 5, 2015.
U.S. Appl. No. 14/798,757, Nonfinal Office Action, dated Jan. 17, 2017.
U.S. Appl. No. 14/798,769, Final Office Action, dated Mar. 14, 2017.
U.S. Appl. No. 14/798,769, Nonfinal Office Action, dated Oct. 6, 2016.
U.S. Appl. No. 14/857,242, Final Office Action, dated Apr. 20, 2016.
U.S. Appl. No. 14/857,242, Nonfinal Office Action, dated Jan. 22, 2016.
U.S. Appl. No. 14/857,242, Notice of Allowance, dated Jul. 1, 2016.
U.S. Appl. No. 14/887,580, Final Office Action, dated Mar. 21, 2017.
U.S. Appl. No. 14/887,580, Nonfinal Office Action, dated Apr. 7, 2016.
U.S. Appl. No. 14/887,580, Nonfinal Office Action, dated Oct. 18, 2016.
U.S. Appl. No. 14/934,326, filed Nov. 6, 2015, Fields et al., "Autonomous Vehicle Operating Status Assessment".
U.S. Appl. No. 14/934,333, filed Nov. 6, 2015, Fields et al., "Autonomous Vehicle Control Assessment and Selection".
U.S. Appl. No. 14/934,339, filed Nov. 6, 2015, Fields et al., "Autonomous Vehicle Operator Identification".
U.S. Appl. No. 14/934,343, filed Nov. 6, 2015, Fields et al., "Autonomous Vehicle Operating Style and Mode Monitoring".
U.S. Appl. No. 14/934,345, filed Nov. 6, 2015, Fields et al. "Autonomous Vehicle Feature Recommendations".
U.S. Appl. No. 14/934,347, filed Nov. 6, 2015, Fields et al. "Autonomous Vehicle Software Version Assessment".

(56) References Cited

OTHER PUBLICATIONS

U.S. Appl. No. 14/934,347, Nonfinal Office Action, dated Mar. 16, 2017.
U.S. Appl. No. 14/934,352, filed Nov. 6, 2015, Fields et al. “Autonomous Vehicle Automatic Parking”.
U.S. Appl. No. 14/934,355, filed Nov. 6, 2015, Fields et al. “Autonomous Vehicle Insurance Based Upon Usage”.
U.S. Appl. No. 14/934,357, filed Nov. 6, 2015, Fields et al. “Autonomous Vehicle Salvage and Repair”.
U.S. Appl. No. 14/934,361, filed Nov. 6, 2015, Fields et al. “Autonomous Vehicle Infrastructure Communication Device”.
U.S. Appl. No. 14/934,371, filed Nov. 6, 2015, Fields et al. “Autonomous Vehicle Accident and Emergency Response”.
U.S. Appl. No. 14/934,381, filed Nov. 6, 2015, Fields et al. “Personal Insurance Policies”.
U.S. Appl. No. 14/934,385, filed Nov. 6, 2015, Fields et al. “Autonomous Vehicle Operating Status Assessment”.
U.S. Appl. No. 14/934,388, filed Nov. 6, 2015, Fields et al., “Autonomous Vehicle Control Assessment and Selection”.
U.S. Appl. No. 14/934,393, filed Nov. 6, 2015, Fields et al., “Autonomous Vehicle Control Assessment and Selection”.
U.S. Appl. No. 14/934,400, filed Nov. 6, 2015, Fields et al., “Autonomous Vehicle Control Assessment and Selection”.
U.S. Appl. No. 14/934,405, filed Nov. 6, 2015, Fields et al., “Autonomous Vehicle Automatic Parking”.
U.S. Appl. No. 14/950,492, Final Office Action, dated May 3, 2016.
U.S. Appl. No. 14/950,492, Nonfinal Office Action, dated Jan. 22, 2016.
U.S. Appl. No. 14/950,492, Notice of Allowance, dated Aug. 3, 2016.
U.S. Appl. No. 14/951,798, Nonfinal Office Action, dated Jan. 27, 2017.
U.S. Appl. No. 14/951,803, “Accident Fault Determination for Autonomous Vehicles”, Konrardy et al., filed Nov. 25, 2015.
U.S. Appl. No. 14/978,266, “Autonomous Feature Use Monitoring and Telematics”, Konrardy et al., filed Dec. 22, 2015.
U.S. Appl. No. 15/005,498, Nonfinal Office Action, dated Mar. 31, 2016.
U.S. Appl. No. 15/005,498, Notice of Allowance, dated Aug. 2, 2016.
U.S. Appl. No. 15/076,142, Nonfinal Office Action, dated Aug. 9, 2016.
U.S. Appl. No. 15/076,142, Notice of Allowance, dated Sep. 19, 2016.
U.S. Appl. No. 15/410,192, “Autonomous Vehicle Operation Feature Monitoring and Evaluation of Effectiveness”, Konrardy et al., filed Jan. 19, 2017.
U.S. Appl. No. 15/421,508, “Autonomous Vehicle Operation Feature Monitoring and Evaluation of Effectiveness”, Konrardy et al., filed Feb. 1, 2017.
U.S. Appl. No. 15/421,521, “Autonomous Vehicle Operation Feature Monitoring and Evaluation of Effectiveness”, Konrardy et al., filed Feb. 1, 2017.
U.S. Appl. No. 14/255,934, Final Office Action, dated Sep. 23, 2014.
U.S. Appl. No. 14/269,490, Final Office Action, dated Jan. 23, 2015.
Wiesenthal et al., “The Influence of Music on Driver Stress,” Journal of Applied Social Psychology 30(8):1709-19 (2000).
Zhou et al., A Simulation Model to Evaluate and Verify Functions of Autonomous Vehicle Based on Simulink, Tongji University, 12 pages (2009).
U.S. Appl. No. 15/229,926, “Advanced Vehicle Operator Intelligence System”, filed Aug. 5, 2016.

* cited by examiner

METHODS OF RECONSTRUCTING AN ACCIDENT SCENE USING TELEMATICS DATA

CROSS-REFERENCE TO RELATED APPLICATIONS

This claims the benefit of U.S. Provisional Application No. 62/027,021 (filed Jul. 21, 2014); U.S. Provisional Application No. 62/040,735 (filed Aug. 22, 2014); U.S. Provisional Application No. 62/145,022 (filed Apr. 9, 2015); U.S. Provisional Application No. 62/145,024 (filed Apr. 9, 2015); U.S. Provisional Application No. 62/145,027 (filed Apr. 9, 2015); U.S. Provisional Application No. 62/145,028 (filed Apr. 9, 2015); U.S. Provisional Application No. 62/145,029 (filed Apr. 9, 2015); U.S. Provisional Application No. 62/145,145 (filed Apr. 9, 2015); U.S. Provisional Application No. 62/145,228 (filed Apr. 9, 2015); U.S. Provisional Application No. 62/145,232 (filed Apr. 9, 2015); U.S. Provisional Application No. 62/145,234 (filed Apr. 9, 2015); U.S. Provisional Application No. 62/145,032 (filed Apr. 9, 2015); and U.S. Provisional Application No. 62/145,033 (filed Apr. 9, 2015). The entirety of each of the foregoing provisional applications is incorporated by reference herein.

Additionally, the present application is related to U.S. patent application Ser. No. 14/798,741 (filed Jul. 14, 2015); U.S. patent application Ser. No. 14/798,750 (filed Jul. 14, 2015); U.S. patent application Ser. No. 14/798,757 (filed Jul. 14, 2015); U.S. patent application Ser. No. 14/798,763 (filed Jul. 14, 2015); U.S. patent application Ser. No. 14/798,609 (filed Jul. 14, 2015); U.S. patent application Ser. No. 14/798,615 (filed Jul. 14, 2015); U.S. patent application Ser. No. 14/798,745 (filed Jul. 14, 2015); U.S. patent application Ser. No. 14/798,633 (filed Jul. 14, 2015); U.S. patent application Ser. No. 14/798,769 (filed Jul. 14, 2015); and U.S. patent application Ser. No. 14/798,770 (filed Jul. 14, 2015).

FIELD

The present embodiments relate generally to telematics data and/or insurance policies. More particularly, the present embodiments relate to performing certain actions, and/or adjusting insurance policies, based upon telematics and/or other data indicative of the behavior of an insured and/or others.

BACKGROUND

Typically, during the claims process, insurance providers rely heavily on eyewitness accounts to determine the sequence of events leading to an accident and, based upon that sequence of events, to determine the cause(s) and/or the individual(s) at fault. For example, an employee of the insurance provider may learn about the sequence of events leading to an accident by talking to the insured and/or other participants in the accident. As another example, the insurance provider employee may review a police report that typically reflects information recorded by a police officer observing the accident scene (well after the accident occurred), and/or reflects secondhand information from participants in the accident and/or other eyewitnesses. As a result, the insurance provider may obtain inaccurate information, which may in turn cause the insurance provider to incorrectly determine cause/fault, and/or fail to appropriately reflect that cause/fault in future actions (e.g., when setting premium levels for an insured involved in the accident, etc.).

The present embodiments may overcome these and/or other deficiencies.

BRIEF SUMMARY

The present embodiments disclose systems and methods that may relate to the intersection of telematics and insurance. In some embodiments, for example, telematics and/or other data may be collected and used to generate a virtual reconstruction of a vehicle accident. The data may be gathered from one or more sources, such as mobile devices (e.g., smart phones, smart glasses, smart watches, smart wearable devices, smart contact lenses, and/or other devices capable of wireless communication); smart vehicles; smart vehicle or smart home mounted sensors; third party sensors or sources of data (e.g., other vehicles, public transportation systems, government entities, and/or the Internet); and/or other sources of information. The virtual reconstruction may be used to determine cause and/or fault of the accident, for example. The fault may be used to handle an insurance claim, for example. More generally, insurance claims, policies, premiums, rates, discounts, rewards, programs, and/or other insurance-related items may be adjusted, generated, and/or updated based upon the fault as determined from the telematics and/or other collected data.

In one aspect, a computer-implemented method of accident scene reconstruction may comprise (1) collecting, by one or more remote servers associated with an insurance provider, accident data associated with a vehicle accident involving a driver. The accident data may include vehicle telematics data, and/or the driver may be associated with an insurance policy issued by the insurance provider. The method may also include (2) analyzing, by the one or more remote servers, the accident data; (3) determining, by the one or more remote servers and based upon the analysis of the accident data, a sequence of events occurring one or more of before, during, or after the vehicle accident; (4) generating, by the one or more remote servers and based upon the determined sequence of events, a virtual reconstruction of one or both of (i) the vehicle accident and (ii) a scene of the vehicle accident; (5) determining, by the one or more remote servers and based upon the virtual reconstruction, fault of the driver for the vehicle accident; and/or (6) using the determined fault of the driver to handle, at the one or more remote servers, an insurance claim associated with the vehicle accident. The method may include additional, less, or alternate actions, including those discussed elsewhere herein.

In another aspect, a system for accident scene reconstruction may comprise one or more processors and one or more memories. The one or more memories may store instructions that, when executed by the one or more processors, cause the one or more processors to (1) collect accident data associated with a vehicle accident involving a driver. The accident data may include vehicle telematics data, and/or the driver may be associated with an insurance policy issued by an insurance provider. The instructions may also cause the one or more processors to (2) analyze the accident data; (3) determine, based upon the analysis of the accident data, a sequence of events occurring one or more of before, during, or after the vehicle accident; (4) generate, based upon the determined sequence of events, a virtual reconstruction of one or both of (i) the vehicle accident and (ii) a scene of the vehicle accident; (5) determine, based upon the virtual reconstruction, fault of the driver for the vehicle accident; and/or (6) use the determined fault of the driver to handle an insurance claim associated with the vehicle accident. The system may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed. It is understood, however, that the present embodiments are not limited to the precise arrangements and instrumentalities shown.

DETAILED DESCRIPTION

The present embodiments may relate to, inter alia, collecting data, including telematics and/or other data, and analyzing the data (e.g., by an insurance provider server or processor) to provide insurance-related benefits to insured individuals, and/or to apply the insurance-related benefits to insurance policies or premiums of insured individuals. The insurance-related benefits may include accurate accident or accident scene reconstructions, and/or more accurate determination of the causes of, and/or fault for, accidents, which may give rise to improved claim handling, more accurate/ fair adjustments to insurance policies and/or premiums, and/or other advantages. As another example, the insurance-related benefits may include identifying misstated or inaccurate claims, which may lower individual premiums on the whole for those within a collective group or pool of insurance customers, for example.

I. Exemplary Telematics Data System

Figure 1:
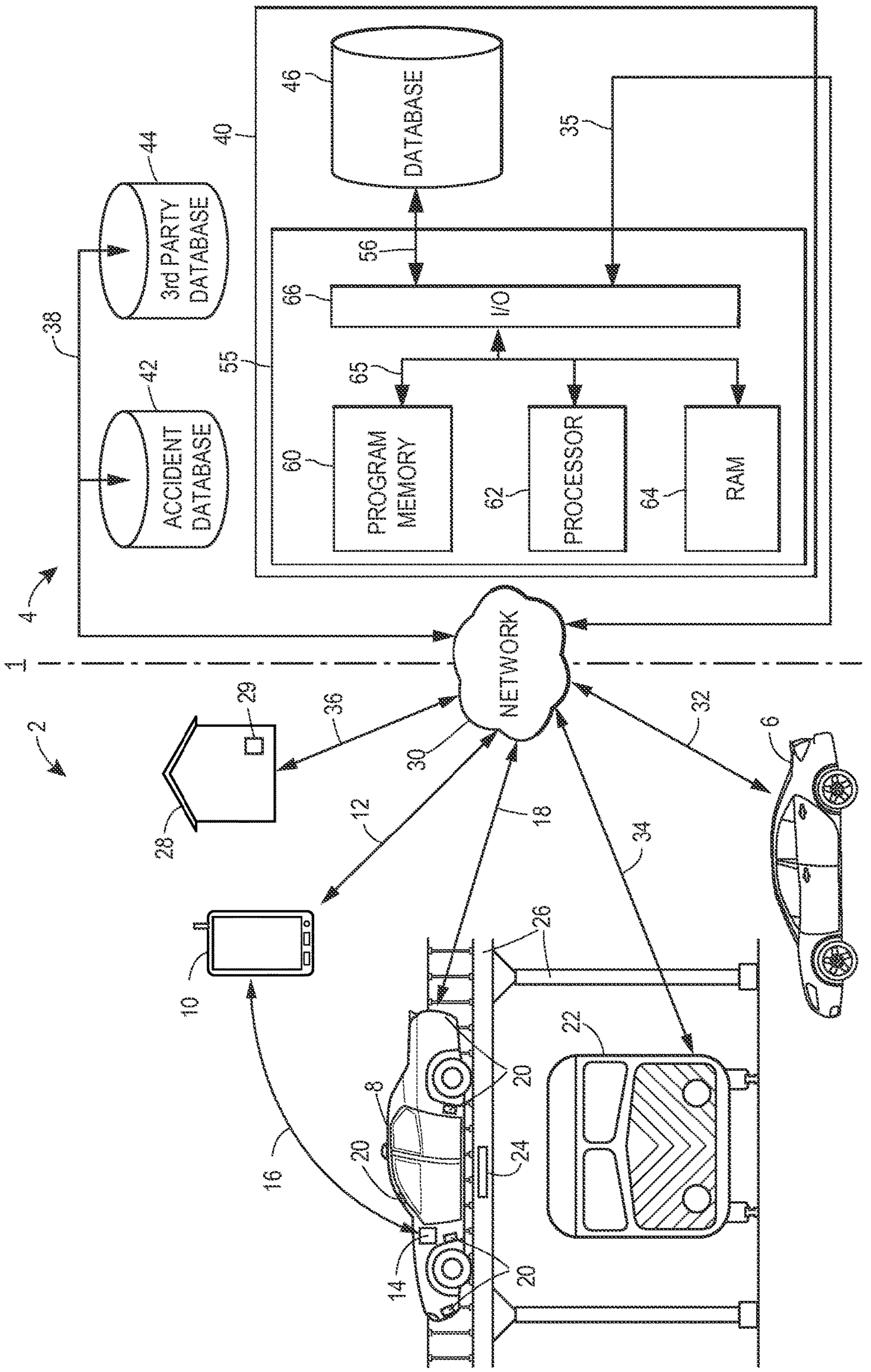
FIG. 1 illustrates an exemplary computer system on which the techniques described herein may be implemented, according to one embodiment.

FIG. 1 illustrates a block diagram of an exemplary telematics system 1 on which the exemplary methods described herein may be implemented. The high-level architecture includes both hardware and software applications, as well as various data communications channels for communicating data between the various hardware and software components. The telematics system 1 may be roughly divided into front-end components 2 and back-end components 4.

The front-end components 2 may obtain information regarding a vehicle 8 (e.g., a car, truck, motorcycle, etc.) and/or the surrounding environment. Information regarding the surrounding environment may be obtained by one or more other vehicles 6, public transportation system components 22 (e.g., a train, a bus, a trolley, a ferry, etc.), infrastructure components 26 (e.g., a bridge, a stoplight, a tunnel, a rail crossing, etc.), smart homes 28 having smart home controllers 29, and/or other components communicatively connected to a network 30. Information regarding the vehicle 8 may be obtained by a mobile device 10 (e.g., a smart phone, a tablet computer, a special purpose computing device, etc.) and/or a smart vehicle controller 14 (e.g., an on-board computer, a vehicle diagnostic system, a vehicle control system or sub-system, etc.), which may be communicatively connected to each other and/or the network 30.

In some embodiments, telematics data may be generated by and/or received from sensors 20 associated with the vehicle 8. Such telematics data from the sensors 20 may be received by the mobile device 10 and/or the smart vehicle controller 14, in some embodiments. Other, external sensors 24 (e.g., sensors associated with one or more other vehicles 6, public transportation system components 22, infrastructure components 26, and/or smart homes 28) may provide further data regarding the vehicle 8 and/or its environment, in some embodiments. For example, the external sensors 24 may obtain information pertaining to other transportation components or systems within the environment of the vehicle 8, and/or information pertaining to other aspect so of that environment. The sensors 20 and the external sensors 24 are described further below, according to some embodiments.

In some embodiments, the mobile device 10 and/or the smart vehicle controller 14 may process the sensor data from sensors 20, and/or other of the front-end components 2 may process the sensor data from external sensors 24. The processed data (and/or information derived therefrom) may then be communicated to the back-end components 4 via the network 30. In other embodiments, the front-end components 2 may communicate the raw sensor data from sensors 20 and/or external sensors 24, and/or other telematics data, to the back-end components 4 for processing. In thin-client embodiments, for example, the mobile device 10 and/or the smart vehicle controller 14 may act as a pass-through communication node for communication with the back-end components 4, with minimal or no processing performed by the mobile device 10 and/or the smart vehicle controller 14. In other embodiments, the mobile device 10 and/or the smart vehicle controller 14 may perform substantial processing of received sensor, telematics, or other data. Summary information, processed data, and/or unprocessed data may be communicated to the back-end components 4 via the network 30.

The mobile device 10 may be a general-use personal computer, cellular phone, smart phone, tablet computer, or a dedicated vehicle use monitoring device. In some embodiments, the mobile device 10 may include a wearable device such as a smart watch, smart glasses, wearable smart technology, or a pager. Although only one mobile device 10 is illustrated, it should be understood that a plurality of mobile devices may be used in some embodiments. The smart vehicle controller 14 may be a general-use on-board computer capable of performing many functions relating to vehicle operation, an on-board computer system or subsystem, or a dedicated computer for monitoring vehicle operation and/or generating telematics data. Further, the smart vehicle controller 14 may be installed by the manufacturer of the vehicle 8 or as an aftermarket modification or addition to the vehicle 8. Either or both of the mobile device 10 and the smart vehicle controller 14 may communicate with the network 30 over link 12 and link 18, respectively.

Additionally, the mobile device 10 and smart vehicle controller 14 may communicate with one another directly over link 16. In some embodiments, the mobile device 10 and/or the smart vehicle controller 14 may communicate with other of the front-end components 2, such as the vehicles 6, public transit system components 22, infrastructure components 26, and/or smart homes 28, either directly or indirectly (e.g., via the network 30).

The one or more sensors 20 referenced above may be removably or fixedly disposed within (and/or on the exterior of) the vehicle 8, within the mobile device 10, and/or within the smart vehicle controller 14, for example. The sensors 20 may include any one or more of various different sensor types, such as an ignition sensor, an odometer, a system clock, a speedometer, a tachometer, an accelerometer, a gyroscope, a compass, a geolocation unit (e.g., a GPS unit), a camera and/or video camera, a distance sensor (e.g., radar, LIDAR, etc.), and/or any other sensor or component capable of generating or receiving data regarding the vehicle 8 and/or the environment in which the vehicle 8 is located.

Some of the sensors 20 (e.g., radar, LIDAR, ultrasonic, infrared, or camera units) may actively or passively scan the vehicle environment for objects (e.g., other vehicles, buildings, pedestrians, etc.), traffic control elements (e.g., lane markings, signs, signals, etc.), external conditions (e.g., weather conditions, traffic conditions, road conditions, etc.), and/or other physical characteristics of the environment. Other sensors of sensors 20 (e.g., GPS, accelerometer, or tachometer units) may provide operational and/or other data for determining the location and/or movement of the vehicle 8. Still other sensors of sensors 20 may be directed to the interior or passenger compartment of the vehicle 8, such as cameras, microphones, pressure sensors, thermometers, or similar sensors to monitor the vehicle operator and/or passengers within the vehicle 8.

The external sensors 24 may be disposed on or within other devices or components within the vehicle's environment (e.g., other vehicles 6, infrastructure components 26, etc.), and may include any of the types of sensors listed above. For example, the external sensors 24 may include sensors that are the same as or similar to sensors 20, but disposed on or within some of the vehicles 6 rather than the vehicle 8.

To send and receive information, each of the sensors 20 and/or external sensors 24 may include a transmitter and/or a receiver designed to operate according to predetermined specifications, such as the dedicated short-range communication (DSRC) channel, wireless telephony, Wi-Fi, or other existing or later-developed communications protocols. As used herein, the terms "sensor" or "sensors" may refer to the sensors 20 and/or external sensors 24.

The other vehicles 6, public transportation system components 22, infrastructure components 26, and/or smart homes 28 may be referred to herein as "external" data sources. The other vehicles 6 may include any other vehicles, including smart vehicles, vehicles with telematics-capable mobile devices, autonomous vehicles, and/or other vehicles communicatively connected to the network 30 via links 32.

The public transportation system components 22 may include bus, train, ferry, ship, airline, and/or other public transportation system components. Such components may include vehicles, tracks, switches, access points (e.g., turnstiles, entry gates, ticket counters, etc.), and/or payment locations (e.g., ticket windows, fare card vending machines, electronic payment devices operated by conductors or passengers, etc.), for example. The public transportation system components 22 may further be communicatively connected to the network 30 via a link 34, in some embodiments.

The infrastructure components 26 may include smart infrastructure or devices (e.g., sensors, transmitters, etc.) disposed within or communicatively connected to transportation or other infrastructure, such as roads, bridges, viaducts, terminals, stations, fueling stations, traffic control devices (e.g., traffic lights, toll booths, entry ramp traffic regulators, crossing gates, speed radar, cameras, etc.), bicycle docks, footpaths, or other infrastructure system components. In some embodiments, the infrastructure components 26 may be communicatively connected to the network 30 via a link (not shown in FIG. 1).

The smart homes 28 may include dwellings or other buildings that generate or collect data regarding their condition, occupancy, proximity to a mobile device 10 or vehicle 8, and/or other information. The smart homes 28 may include smart home controllers 29 that monitor the local environment of the smart home, which may include sensors (e.g., smoke detectors, radon detectors, door sensors, window sensors, motion sensors, cameras, etc.). In some embodiments, the smart home controller 29 may include or be communicatively connected to a security system controller for monitoring access and activity within the environment. The smart home 28 may further be communicatively connected to the network 30 via a link 36, in some embodiments.

The external data sources may collect data regarding the vehicle 8, a vehicle operator, a user of an insurance program, and/or an insured of an insurance policy. Additionally, or alternatively, the other vehicles 6, the public transportation system components 22, the infrastructure components 26, and/or the smart homes 28 may collect such data, and provide that data to the mobile device 10 and/or the smart vehicle controller 14 via links not shown in FIG. 1.

In some embodiments, the front-end components 2 communicate with the back-end components 4 via the network 30. The network 30 may include a proprietary network, a secure public internet, a virtual private network and/or one or more other types of networks, such as dedicated access lines, plain ordinary telephone lines, satellite links, cellular data networks, or combinations thereof. In embodiments where the network 30 comprises the Internet, data communications may take place over the network 30 via an Internet communication protocol.

The back-end components 4 may use a remote server 40 to receive data from the front-end components 2, determine characteristics of vehicle use, determine risk levels, modify insurance policies, and/or perform other processing functions in accordance with any of the methods described herein. In some embodiments, the server 40 may be associated with an insurance provider, either directly or indirectly. The server 40 may include one or more computer processors adapted and configured to execute various software applications and components of the telematics system 1.

The server 40 may further include a database 46, which may be adapted to store data related to the operation of the vehicle 8 and/or other information. As used herein, the term "database" may refer to a single database or other structured data storage, or to a collection of two or more different databases or structured data storage components. Additionally, the server 40 may be communicatively coupled via the network 30 to one or more data sources, which may include an accident database 42 and/or a third party database 44. The accident database 42 and/or third party database 44 may be communicatively connected to the network via a communication link 38. The accident database 42 and/or the third party database 44 may be operated or maintained by third parties, such as commercial vendors, governmental entities, industry associations, nonprofit organizations, or others.

The data stored in the database 46 might include, for example, dates and times of vehicle use, duration of vehicle use, speed of the vehicle 8, RPM or other tachometer readings of the vehicle 8, lateral and longitudinal acceleration of the vehicle 8, incidents or near-collisions of the vehicle 8, communications between the vehicle 8 and external sources (e.g., other vehicles 6, public transportation system components 22, infrastructure components 26, smart homes 28, and/or external information sources communicating through the network 30), environmental conditions of vehicle operation (e.g., weather, traffic, road condition, etc.), errors or failures of vehicle features, and/or other data relating to use of the vehicle 8 and/or the vehicle operator. Prior to storage in the database 46, some of the data may have been uploaded to the server 40 via the network 30 from the mobile device 10 and/or the smart vehicle controller 14. Additionally, or alternatively, some of the data may have been obtained from additional or external data sources via the network 30. Additionally, or alternatively, some of the data may have been generated by the server 40. The server 40 may store data in the database 46 and/or may access data stored in the database 46 when executing various functions and tasks associated with the methods described herein.

The server 40 may include a controller 55 that is operatively connected to the database 46 via a link 56. It should be noted that, while not shown in FIG. 1, one or more additional databases may be linked to the controller 55 in a known manner. For example, separate databases may be used for sensor data, vehicle insurance policy information, and vehicle use information. The controller 55 may include a program memory 60, a processor 62 (which may be called a microcontroller or a microprocessor), a random-access memory (RAM) 64, and an input/output (I/O) circuit 66, all of which may be interconnected via an address/data bus 65. It should be appreciated that although only one microprocessor 62 is shown, the controller 55 may include multiple microprocessors 62. Similarly, the memory of the controller 55 may include multiple RAMs 64 and multiple program memories 60. Although the I/O circuit 66 is shown as a single block, it should be appreciated that the I/O circuit 66 may include a number of different types of I/O circuits. The RAM 64 and program memories 60 may be implemented as semiconductor memories, magnetically readable memories, or optically readable memories, for example. The controller 55 may also be operatively connected to the network 30 via a link 35.

The server 40 may further include a number of software applications stored in a program memory 60. The various software applications on the server 40 may include specific programs, routines, or scripts for performing processing functions associated with the methods described herein. Additionally, or alternatively, the various software application on the server 40 may include general-purpose software applications for data processing, database management, data analysis, network communication, web server operation, or other functions described herein or typically performed by a server. The various software applications may be executed on the same computer processor or on different computer processors. Additionally, or alternatively, the software applications may interact with various hardware modules that may be installed within or connected to the server 40. Such modules may implement part of all of the various exemplary methods discussed herein or other related embodiments.

In some embodiments, the server 40 may be a remote server associated with or operated by or on behalf of an insurance provider. The server 40 may be configured to receive, collect, and/or analyze telematics and/or other data in accordance with any of the methods described herein. The server 40 may be configured for one-way or two-way wired or wireless communication via the network 30 with a number of telematics and/or other data sources, including the accident database 42, the third party database 44, the database 46 and/or the front-end components 2. For example, the server 40 may be in wireless communication with mobile device 10; insured smart vehicles 8; smart vehicles of other motorists 6; smart homes 28; present or past accident database 42; third party database 44 operated by one or more government entities and/or others; public transportation system components 22 and/or databases associated therewith; smart infrastructure components 26; and/or the Internet. The server 40 may be in wired or wireless communications with other sources of data, including those discussed elsewhere herein.

Although the telematics system 1 is shown in FIG. 1 to include one vehicle 8, one mobile device 10, one smart vehicle controller 14, one other vehicle 6, one public transportation system component 22, one infrastructure component 26, one smart home 28, and one server 40, it should be understood that different numbers of each may be utilized. For example, the system 1 may include a plurality of servers 40 and hundreds or thousands of mobile devices 10 and/or smart vehicle controllers 14, all of which may be interconnected via the network 30. Furthermore, the database storage or processing performed by the server 40 may be distributed among a plurality of servers in an arrangement known as "cloud computing." This configuration may provide various advantages, such as enabling near real-time uploads and downloads of information as well as periodic uploads and downloads of information. This may in turn support a thin-client embodiment of the mobile device 10 or smart vehicle controller 14 discussed herein.

Figure 2:
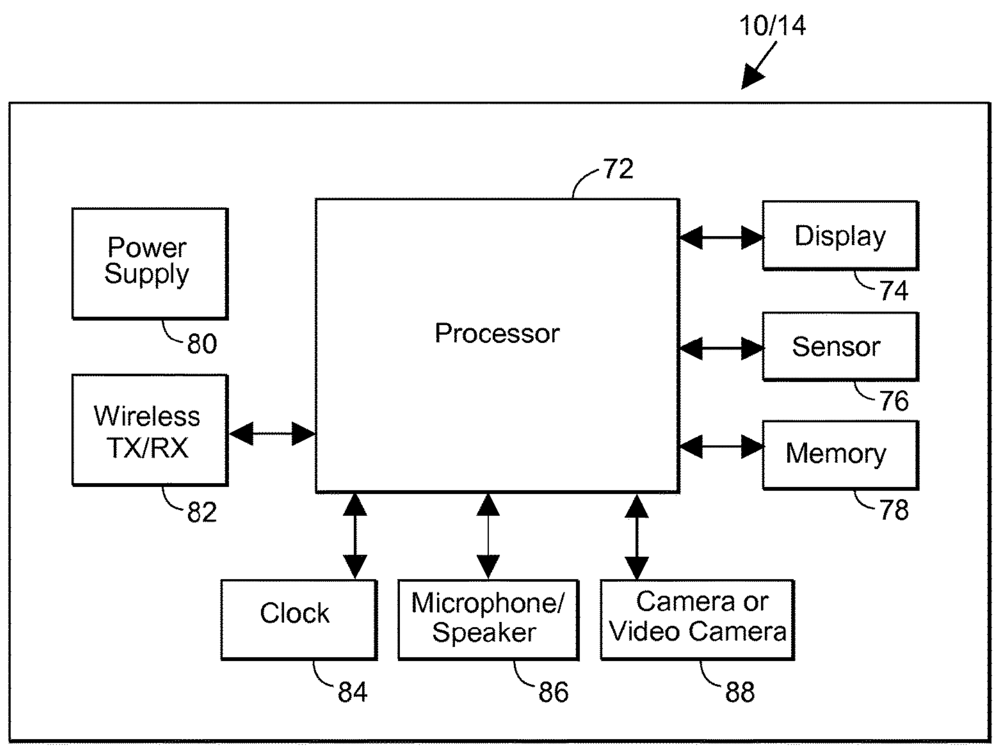
FIG. 2 illustrates an exemplary mobile device or smart vehicle controller that may collect, receive, generate and/or send telematics and/or other data for purposes of the techniques described herein, according to one embodiment.

FIG. 2 illustrates a block diagram of an exemplary mobile device 10 and/or smart vehicle controller 14. The mobile device 10 and/or smart vehicle controller 14 may include a processor 72, display 74, sensor 76, memory 78, power supply 80, wireless radio frequency transceiver 82, clock 84, microphone and/or speaker 86, and/or camera or video camera 88. In other embodiments, the mobile device and/or smart vehicle controller may include additional, fewer, and/or alternate components.

The sensor 76 may be able to record audio or visual information. If FIG. 2 corresponds to the mobile device 10, for example, the sensor 76 may be a camera integrated within the mobile device 10. The sensor 76 may alternatively be configured to sense speed, acceleration, directional, fluid, water, moisture, temperature, fire, smoke, wind, rain, snow, hail, motion, and/or other type of condition or parameter, and/or may include a gyro, compass, accelerometer, or any other type of sensor described herein (e.g., any of the sensors 20 described above in connection with FIG. 1). Generally, the sensor 76 may be any type of sensor that is currently existing or hereafter developed and is capable of providing information regarding the vehicle 8, the environment of the vehicle 8, and/or a person.

The memory 78 may include software applications that control the mobile device 10 and/or smart vehicle controller 14, and/or control the display 74 configured for accepting user input. The memory 78 may include instructions for controlling or directing the operation of vehicle equipment that may prevent, detect, and/or mitigate vehicle damage.

The memory 78 may further include instructions for controlling a wireless or wired network of a smart vehicle, and/or interacting with mobile device 10 and remote server 40 (e.g., via the network 30).

The power supply 80 may be a battery or dedicated energy generator that powers the mobile device 10 and/or smart vehicle controller 14. The power supply 80 may harvest energy from the vehicle environment and be partially or completely energy self-sufficient, for example.

The transceiver 82 may be configured for wireless communication with sensors 20 located about the vehicle 8, other vehicles 6, other mobile devices similar to mobile device 10, and/or other smart vehicle controllers similar to smart vehicle controller 14. Additionally, or alternatively, the transceiver 82 may be configured for wireless communication with the server 40, which may be remotely located at an insurance provider location.

The clock 84 may be used to time-stamp the date and time that information is gathered or sensed by various sensors. For example, the clock 84 may record the time and date that photographs are taken by the camera 88, video is captured by the camera 88, and/or other data is received by the mobile device 10 and/or smart vehicle controller 14.

The microphone and speaker 86 may be configured for recognizing voice or audio input and/or commands. The clock 84 may record the time and date that various sounds are collected by the microphone and speaker 86, such as sounds of windows breaking, air bags deploying, tires skidding, conversations or voices of passengers, music within the vehicle 8, rain or wind noise, and/or other sound heard within or outside of the vehicle 8.

The present embodiments may be implemented without changes or extensions to existing communications standards. The smart vehicle controller 14 may also include a relay, node, access point, Wi-Fi AP (Access Point), local node, pico-node, relay node, and/or the mobile device 10 may be capable of RF (Radio Frequency) communication, for example. The mobile device 10 and/or smart vehicle controller 14 may include Wi-Fi, Bluetooth, GSM (Global System for Mobile communications), LTE (Long Term Evolution), CDMA (Code Division Multiple Access), UMTS (Universal Mobile Telecommunications System), and/or other types of components and functionality.

II. Telematics Data

Telematics data, as used herein, may include telematics data, and/or other types of data that have not been conventionally viewed as "telematics data." The telematics data may be generated by, and/or collected or received from, various sources. For example, the data may include, indicate, and/or relate to vehicle (and/or mobile device) speed; acceleration; braking; deceleration; turning; time; GPS (Global Positioning System) or GPS-derived location, speed, acceleration, or braking information; vehicle and/or vehicle equipment operation; external conditions (e.g., road, weather, traffic, and/or construction conditions); other vehicles or drivers in the vicinity of an accident; vehicle-to-vehicle (V2V) communications; vehicle-to-infrastructure communications; and/or image and/or audio information of the vehicle and/or insured driver before, during, and/or after an accident. The data may include other types of data, including those discussed elsewhere herein. The data may be collected via wired or wireless communication.

The data may be generated by mobile devices (smart phones, cell phones, lap tops, tablets, phablets, PDAs (Personal Digital Assistants), computers, smart watches, pagers, hand-held mobile or portable computing devices, smart glasses, smart electronic devices, wearable devices, smart contact lenses, and/or other computing devices); smart vehicles; dash or vehicle mounted systems or original telematics devices; public transportation systems; smart street signs or traffic lights; smart infrastructure, roads, or highway systems (including smart intersections, exit ramps, and/or toll booths); smart trains, buses, or planes (including those equipped with Wi-Fi or hotspot functionality); smart train or bus stations; internet sites; aerial, drone, or satellite images; third party systems or data; nodes, relays, and/or other devices capable of wireless RF (Radio Frequency) communications; and/or other devices or systems that capture image, audio, or other data and/or are configured for wired or wireless communication.

In some embodiments, the data collected may also derive from police or fire departments, hospitals, and/or emergency responder communications; police reports; municipality information; automated Freedom of Information Act requests; and/or other data collected from government agencies and officials. The data from different sources or feeds may be aggregated.

The data generated may be transmitted, via wired or wireless communication, to a remote server, such as a remote server and/or other processor(s) associated with an insurance provider. The remote server and/or associated processors may build a database of the telematics and/or other data, and/or otherwise store the data collected.

The remote server and/or associated processors may analyze the data collected and then perform certain actions and/or issue tailored communications based upon the data, including the insurance-related actions or communications discussed elsewhere herein. The automatic gathering and collecting of data from several sources by the insurance provider, such as via wired or wireless communication, may lead to expedited insurance-related activity, including the automatic identification of insured events, and/or the automatic or semi-automatic processing or adjusting of insurance claims.

In one embodiment, telematics data may be collected by a mobile device (e.g., smart phone) application. An application that collects telematics data may ask an insured for permission to collect and send data about driver behavior and/or vehicle usage to a remote server associated with an insurance provider. In return, the insurance provider may provide incentives to the insured, such as lower premiums or rates, or discounts. The application for the mobile device may be downloadable off of the internet.

In some embodiments, the telematics and/or other data generated, collected, determined, received, transmitted, analyzed, or otherwise utilized may relate to biometrics. For example, biometrics data may be used by an insurance provider to push wireless communications to a driver or an insured related to health and/or driving warnings or recommendations. In one aspect, a wearable electronics device may monitor various physical conditions of a driver to determine the physical, mental, and/or emotional condition of the driver, which may facilitate identification of a driver that may have a high risk of accident. Wearable electronics devices may monitor, for example, blood pressure or heart rate. Such data may be remotely gathered by an insurance provider remote server 40 for insurance-related purposes, such as for automatically generating wireless communications to the insured and/or policy and premium adjustments.

In some embodiments, the telematics and/or other data may indicate a health status of a driver. If biometrics data indicates that an insured is having a heart attack, for example, a recommendation or warning to stop driving and/or go to a hospital may be issued to the insured via the mobile device 10 or other means, and/or the insurance provider (or mobile device 10 or smart vehicle controller 14) may issue a request for immediate medical assistance.

The biometrics data may indicate the health or status of an insured immediately after an accident has occurred. The biometrics data may be automatically analyzed by the remote server 40 to determine that an ambulance should be sent to the scene of an accident. In the unfortunate situation that a death and/or a cause of death (e.g, severe auto accident) is indicated (from the telematics or other data, or from emergency responder wireless communication), an insurance provider may remotely receive that information at a remote server 40, and/or automatically begin processing a life insurance policy claim for the insured.

III. Cause of Accident and/or Fault Determination

The present embodiments may determine the cause of a vehicle accident from analyzing the telematics and/or other data collected (e.g., any type or types of telematics and/or other data described above in Section I and/or Section II). An accident may be determined to have been fully, primarily, or partially caused by a number of factors, such as weather conditions, road or traffic conditions, construction, human error, technology error, vehicle or vehicle equipment faulty operation, and/or other factors.

In one aspect, the present embodiments may determine who was at fault (either entirely or partially) for causing a vehicle collision or accident. Mobile devices, smart vehicles, equipment and/or sensors mounted on and/or within a vehicle, and/or roadside or infrastructure systems may detect certain indicia of fault, or perhaps more importantly (from the insured's perspective), a lack of fault. An insured may opt-in to an insurance program that allows an insurance provider to collect telematics and/or other data, and to analyze that data for low- or high-risk driving and/or other behavior (e.g., for purposes of fault determination). The analysis of the data and/or low- or high-risk behavior identified, and/or the determination of fault, may be used to handle an insurance claim, and/or used to lower insurance premiums or rates for the insured, and/or to provide insurance discounts, or rewards to the insured, etc.

Telematics data and/or other types of data may be generated and/or collected by, for example, (i) a mobile device (smart phone, smart glasses, etc.), (ii) cameras mounted on the interior or exterior of an insured (or other) vehicle, (iii) sensors or cameras associated with a roadside system, and/or (iv) other electronic systems, such as those mentioned above, and may be time-stamped. The data may indicate that the driver was driving attentively before, during, and/or after an accident. For instance, the data collected may indicate that a driver was driving alone and/or not talking on a smart phone or texting before, during, and/or after an accident. Responsible or normal driving behavior may be detected and/or rewarded by an insurance provider, such as with lower rates or premiums, or with good driving discounts for the insured.

Additionally or alternatively, video or audio equipment or sensors may capture images or conversations illustrating that the driver was driving lawfully and/or was generally in good physical condition and calm before the accident. Such information may indicate that the other driver or motorist (for a two-vehicle accident) may have been primarily at fault.

Conversely, an in-cabin camera or other device may capture images or video indicating that the driver (the insured) or another motorist (e.g., a driver uninsured by the insurance provider) involved in an accident was distracted or drowsy before, during, and/or after an accident. Likewise, erratic behavior or driving, and/or drug or alcohol use by the driver or another motorist, may be detected from various sources and sensors. Telematics data, such as data gathered from the vehicle and/or a mobile device within the vehicle, may also be used to determine that, before or during an accident, one of the drivers was speeding; following another vehicle too closely; and/or had time to react and avoid the accident.

In addition to human drivers, fault may be assigned to vehicle collision avoidance functionality, such that the insured's insurance premium or rate may not be negatively impacted by faulty technology. The telematics and/or other data collected may include video and/or audio data, and may indicate whether a vehicle, or certain vehicle equipment, operated as designed before, during, and/or after the accident. That data may assist in reconstructing a sequence of events associated with an insured event (e.g., a vehicle collision).

For instance, the data gathered may relate to whether or not the vehicle software or other collision avoidance functionality operated as it was intended or otherwise designed to operate. Also, a smart vehicle control system or mobile device may use G-force data and/or acoustic information to determine certain events. The data may further indicate whether or not (1) an air bag deployed; (2) the vehicle brakes were engaged; and/or (3) vehicle safety equipment (lights, wipers, turn signals, etc.), and/or other vehicle systems operated properly, before, during, and/or after an accident.

Fault or blame, whole or partial, may further be assigned to environmental and/or other conditions that were causes of the accident. Weather, traffic, and/or road conditions; road construction; other accidents in the vicinity; and/or other conditions before, during, and/or after a vehicle accident (and in the vicinity of the location of the accident) may be determined (from analysis of the telematics and/or other data collected) to have contributed to causing the accident and/or insured event. A percentage of fault or blame may be assigned to each of the factors that contributed to causing an accident, and/or the severity thereof.

A sliding deductible and/or rate may depend upon the percentage of fault assigned to the insured. The percent of fault may be determined to be 0% or 50%, for example, which may impact an amount that is paid by the insurance provider for damages and/or an insurance claim.

IV. Accident Reconstruction

The telematics and/or other data gathered from the various sources, such as any type or types of telematics and/or other data described above in Section I and/or Section II (e.g., mobile devices; smart vehicles; sensors or cameras mounted in or on an insured vehicle or a vehicle associated with another motorist; biometric devices; public transportation systems or other roadside cameras; aerial or satellite images; etc.), may facilitate recreating the series of events that led to an accident. The data gathered may be used by investigative services associated with an insurance provider to determine, for a vehicle accident, (1) an accident cause and/or (2) lack of fault and/or fault, or a percentage of fault, that is assigned or attributed to each of the drivers involved. The data gathered may also be used to identify one or more non-human causes of the accident, such as road construction, or weather, traffic, and/or road conditions.

A. Time-Stamped Sequence of Events

The series or sequence of events may facilitate establishing that an insured had no, or minimal, fault in causing a vehicle accident. Such information may lead to lower premiums or rates for the insured, and/or no change in insurance premiums or rates for the insured, due to the accident. Proper fault determination may also allow multiple insurance providers to assign proper risk to each driver involved in an accident, and adjust their respective insurance premiums or rates accordingly such that good driving behavior is not improperly penalized.

In one aspect, audio and/or video data may be recorded. To facilitate accurate reconstruction of the sequence of events, the audio and video data may capture time-stamped sound and images, respectively. Sound and visual data may be associated with and/or indicate, for example, vehicle braking; vehicle speed; vehicle turning; turn signal, window wiper, head light, and/or brake light normal or faulty operation; windows breaking; air bags deploying; and/or whether the vehicle or vehicle equipment operated as designed, for each vehicle involved in a vehicle accident or other insured event.

B. Virtual Accident Reconstruction

The telematics and/or other data gathered may facilitate accident reconstruction, and an accident scene or series of events may be recreated. As noted above, from the series of events leading up to, during, and/or after the accident, fault (or a percentage of fault) may be assigned to an insured and/or another motorist. The data gathered may be viewed as accident forensic data, and/or may be applied to assign fault or blame to one or more drivers, and/or to one or more external conditions.

For example, the telematics and/or other data gathered may indicate weather, traffic, road construction, and/or other conditions. The data gathered may facilitate scene reconstructions, such as graphic presentations on a display of a virtual map. The virtual map may include a location of an accident; areas of construction; areas of high or low traffic; and/or areas of bad weather (rain, ice, snow, etc.), for example.

The virtual map may indicate a route taken by a vehicle or multiple vehicles involved in an accident. A timeline of events, and/or movement of one or more vehicles, may be depicted via, or superimposed upon, the virtual map. As a result, a graphical or virtual moving or animated representation of the events leading up to, during, and/or after the accident may be generated.

The virtual representation of the vehicle accident may facilitate (i) fault, or percentage of fault, assignment to one or more drivers; and/or (ii) blame, or percentage of blame, assignment to one or more external conditions, such as weather, traffic, and/or construction. The assignments of fault and/or blame, or lack thereof, may be applied to handling various insurance claims associated with the vehicle accident, such as claims submitted by an insured or other motorists. The insured may be insured by an insurance provider, and the other motorists may be insured by the same or another insurance provider. The assignments of fault and/or blame, or lack thereof, may lead to appropriate adjustments to the insurance premiums or rates for the insured and/or the other motorists to reflect the cause or causes of the accident determined from the data collected.

The virtual representation of the vehicle accident may account for several vehicles involved in the accident. The sequence of events leading up to and including the accident may include analysis of the telematics and/or other data to determine or estimate what each of several vehicles and/or respective drivers did (or did not) do prior to, during, and/or after the accident.

As an example, voice data from using a smart phone to place a telephone call before or during an accident may indicate a distracted driver. As another example, vehicle sensors may detect seat belt usage, such as seat belt usage before or during an accident, and/or the frequency or amount of seat belt usage by a specific driver. The data may reveal the number of children or other passengers in a vehicle before or during an accident.

Moreover, GPS (Global Positioning System) location and speed data from several vehicles may be collected. Other vehicle data may also be collected, such as data indicating whether (i) turn signals were used; (ii) head lights were on; (iii) the gas or brake pedal for a vehicle was pressed or depressed; and/or (iv) a vehicle was accelerating, decelerating, braking, maneuvering, turning, in its respective lane, and/or changing lanes.

Infrastructure data, such as data from public transportation systems and/or smart traffic lights, may also be collected. Thus, for each vehicle accident or insured event, a unique combination of data may be gathered at the insurance provider remote server (e.g., server 40 of FIG. 1) and then analyzed to determine a most likely series of events leading up to the insured event.

V. Claim Accuracy Verification/Buildup Identification

The telematics and/or other data gathered from the various sources (e.g., any type or types of telematics and/or other data described above in Section I and/or Section II) may also, or instead, be used to verify accurate insurance claims, and/or to identify overstated claims and/or buildup. The data may verify an insured's account of events, the severity of the accident, the damage to a vehicle, the injuries to passengers riding in the vehicle, and/or other items to ensure that an insured is properly compensated and/or that the insured's insurance claim is properly and efficiently handled.

Automatic, prompt verification of the veracity of an insurance claim may speed up claim processing, and lead to quicker claim payout monies being issued to an insured. The automatic verification of the claim, such as by an insurance provider remote server (e.g., server 40 of FIG. 1), may also lead to less hassle for the insured in resolving the insurance claim, and/or require less time on the part of the insured in filling out insurance claim-related paperwork or otherwise getting their insurance claim resolved.

The data collected may be used to verify whether a "hit and run" accident was truly a hit and run, for example. For "hit and run" accident claims, telematics and/or other data may be used to determine (i) whether the vehicle was running, or alternatively not in use, at the time of the accident, and/or (ii) whether the location at which the insurance claim indicates that the vehicle was located at the time of the accident is accurate. The data may indicate whether the car was parked or not moving, and/or indeed moving (and speed), at the time of the accident. Such information may indicate whether an insurance claim for an insured event is accurate, as opposed to including potential buildup.

The telematics and/or other data gathered may also indicate the number of persons involved in the accident. For instance, data may indicate or verify that there were five passengers in the vehicle at the time of the accident, as reported by the insured. As another example, the data may reveal that only two passengers were in the vehicle, and not four injured persons as reported in an insurance claim.

As another example, and as noted above, vehicle location may be verified. An insurance claim for a hit and run accident may state that the insured vehicle was parked in a certain parking lot or garage at 2 p.m. The telematics data gathered (e.g., including GPS data from a mobile device or smart vehicle) may verify the location of the insured vehicle at that time. Alternatively, the telematics data gathered may indicate that the insured vehicle was actually located half-way across town at that time. In this manner, the data gathered may be used to verify accurate claims, and not penalize an insured for accurate claim reporting, as well as to detect potential fraudulent and/or inflated claims that may warrant further investigation by an insurance provider.

A. Estimating Likely Damage Associated with Insured Event

The telematics and/or other data gathered may relate to classifying automobile accidents by type and/or estimating a probability of injury to the insured and/or passengers. The data gathered may indicate the type of accident, the likely condition of the vehicle after the accident, and/or the likely health of the insured and/or passengers after the accident. The data may further indicate the veracity of an insurance claim to facilitate prompt and accurate handling of an insurance claim submitted by an insured for an insured event.

For a severe accident, major vehicle repair work and/or medical bills for the passengers involved in the accident may be anticipated or expected. For instances where the data indicates a severe accident, the insurance provider may quickly verify the associated insurance claims. Subsequently, the insurance claims may be promptly handled and the insured may receive prompt payment.

On the other hand, for a minor accident, major vehicle repair work or extensive medical bills may not be anticipated or expected, and insurance claims for such may indicate potential buildup. As an example, a request for back surgery resulting from a minor collision may be indicative of an inflated claim, and may be flagged for further investigation by the insurance provider.

B. Police Report Information

In one embodiment, data pertinent to an insured event that is generated by government officials may be collected at an insurance provider remote server (e.g., server 40 of FIG. 1). Police report information may be collected automatically (e.g., with the permission of an insured). The police report information may have information related to the cause of an insured event (e.g., vehicle accident and/or fire losses, including home fire losses). The police report information may include a series of events leading up to the insured event, witness names, and/or other information useful to handling insurance claims. The police report information may be automatically scanned, or otherwise collected and stored in a database or other memory associated with the insurance provider.

Data from the governmental bodies may also be acquired through Freedom of Information Act (FOIA) requests that may provide the public with access to public records, including police or accident reports. The FOIA requests may be automatically generated and/or submitted by an insurance provider remote server (e.g., server 40 of FIG. 1) once an insured event is detected/determined to have occurred from the telematics and/or other data collected, and/or analyzed at the insurance provider remote server. Additionally or alternatively, the FOIA requests may be automatically generated and/or submitted once an insurance claim is received from an insured. The public records may facilitate determining accurate insurance claims and/or verifying insurance claims submitted, leading to timely processing.

VI. Exemplary Fault Determination Method

Figure 3:
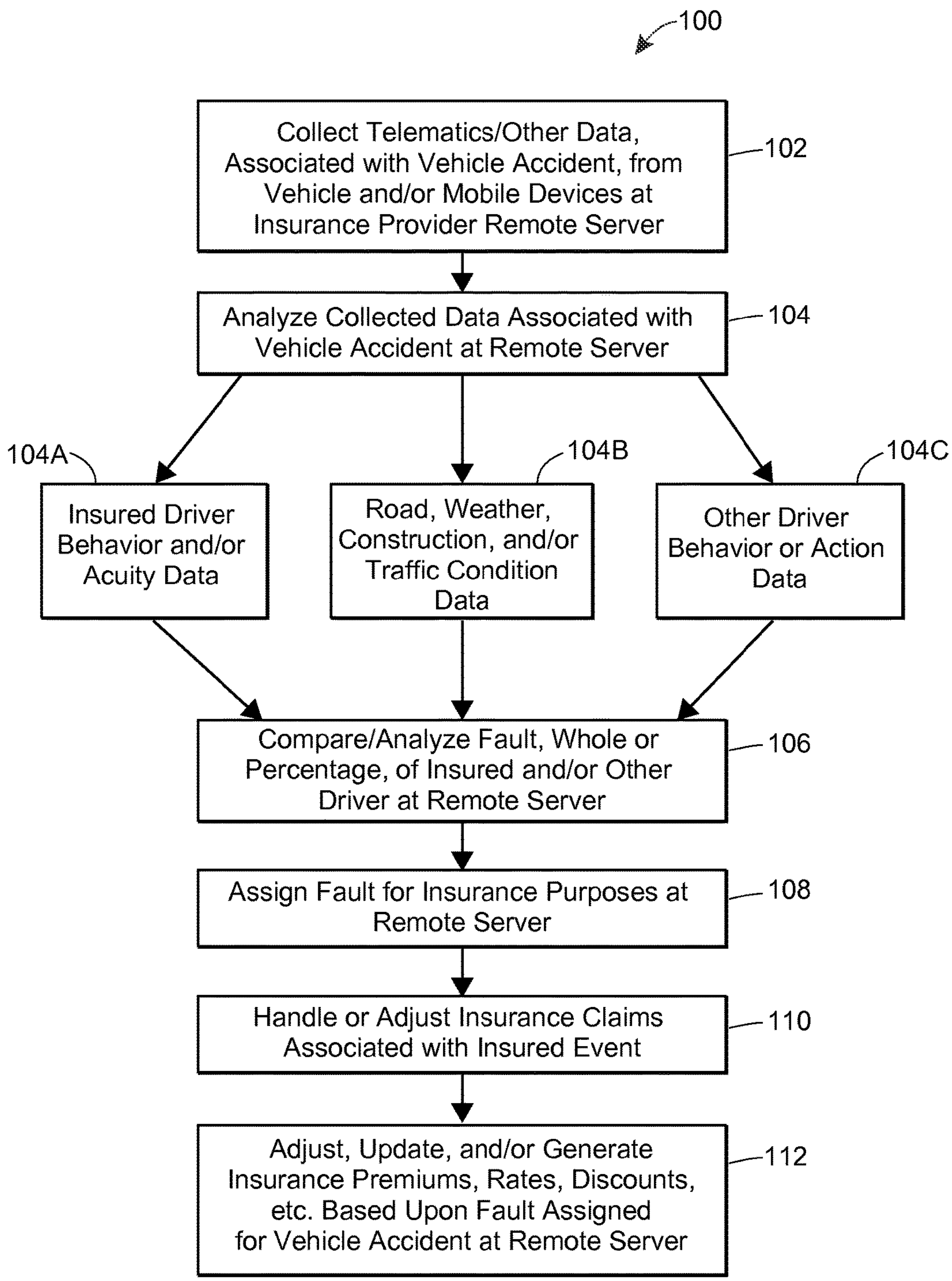
FIG. 3 illustrates an exemplary computer-implemented method of cause and/or fault determination for an insured event, according to one embodiment.

FIG. 3 illustrates an exemplary computer-implemented method 100 for facilitating fault determination for a vehicle accident. In some embodiments, the method 100 may be implemented in whole or in part by one or more components of the system 1 depicted in FIG. 1. For example, the method 100 may be implemented by one or more servers remote from the components (e.g., sensors, vehicles, mobile devices, etc.) sourcing telematics data, such as the server 40 (e.g., processor(s) 62 of the server 40 when executing instructions stored in the program memory 60 of the server 40) or another server not shown in FIG. 1.

The method 100 may include collecting accident data associated with a vehicle accident involving a driver (block 102). The driver may be associated with an insurance policy issued by the insurance provider (e.g., an owner of the policy, or another individual listed on the policy). The accident data may include telematics data, and possibly other data, collected from one or more sources. For example, the accident data may include data associated with or generated by one or more mobile devices (e.g., mobile device 10 of FIGS. 1 and 2); an insured vehicle or a computer system of the insured vehicle (e.g., vehicle 8 or smart vehicle controller 14 of FIGS. 1 and 2, or one or more sensors mounted on the vehicle); a vehicle other than the insured vehicle (e.g., vehicle 6 of FIG. 1); vehicle-to-vehicle (V2V) communication (e.g., communications between vehicle 8 and vehicle 6 in FIG. 1); and/or roadside equipment or infrastructure located near a location of the vehicle accident (e.g., infrastructure components 26 of FIG. 1). Generally, the accident data may include any one or more of the types of data discussed above in Section I and/or II (and/or other suitable types of data), and may be collected according to any of the techniques discussed above in Section I and/or II (and/or other suitable techniques). The accident data may have been generated by the respective source(s), and/or collected, before, during and/or after the accident.

The method 100 may also include analyzing any or all of the collected accident data (block 104). As shown in FIG. 3, for example, insured driver behavior and/or acuity data may be analyzed (block 104A), road, weather, construction, and/or traffic conditions data may be analyzed (block 104B), and/or other vehicle and/or other driver behavior or action data may be analyzed (block 104C). As a more specific example, driver acuity data (e.g., phone usage data) collected from the insured's vehicle and/or mobile device may be analyzed to determine precisely when, in relation to the time of the accident, the insured was or was not likely distracted (e.g., talking on the phone). As another example, weather data (e.g., collected by a mobile device or vehicle-mounted camera, or from a third party server) may be analyzed to determine weather conditions, such as rain, snow or fog, during and/or just prior to the accident. As yet another example, other driver behavior data (e.g., collected by a sensor mounted on the insured's vehicle, or a roadside camera or other sensor, etc.) may be analyzed to determine the speed, direction, lane usage, etc., of one or more drivers other than the insured.

In some embodiments, other data is also, or instead, analyzed at block 104. For example, data pertaining to other vehicle accidents occurring at the same location (e.g., a particular intersection) may be analyzed. Such an analysis may indicate that the street configuration, or another characteristic, of the accident location is likely at least a partial cause of the accident, for example.

The method 100 may also include determining, based upon the analysis of the accident data at block 104 (e.g., at one or more of blocks 104A through 104C), fault of the driver for the vehicle accident (blocks 106, 108). As seen in FIG. 3, for example, the fault for the driver (e.g., the insured) and/or for another driver may be compared or otherwise analyzed (block 106), and then assigned to the respective individuals for insurance purposes (block 108). The fault may be determined as one or more binary indicators (e.g., "at fault" or "not at fault"), percentages (e.g., "25% responsible"), ratios or fractions, and/or any other suitable indicator(s) or measure(s) of fault. In some embodiments and/or scenarios, fault for a first individual is implicitly determined based upon the fault that is explicitly determined for another individual (e.g., an insured may implicitly be determined to have 0% fault if another driver is explicitly determined to be 100% at fault).

The method 100 may also include using the fault determined at blocks 106, 108 to handle or adjust an insurance claim associated with the vehicle accident (block 110). For example, the determined fault of the driver (e.g., insured) may be used to determine the appropriate payout by the insurance provider, or whether another insurance provider should be responsible for payment, etc.

The method 100 may also include using the fault determined at blocks 106, 108 to adjust, generate and/or update one or more insurance-related items (block 112). The insurance-related item(s) may include, for example, parameters of the insurance policy (e.g., a deductible), a premium, a rate, a discount, and/or a reward. As a more specific example, if it is determined that the driver (e.g., insured) is at least partially at fault, the driver's insurance premium may be increased.

In other embodiments, the method 100 may include additional, fewer, or alternate actions as compared to those shown in FIG. 3, including any of those discussed elsewhere herein. For example, the method 100 may further include transmitting information indicative of the adjusted, generated, or updated insurance-related items to a mobile device associated with the driver (or another individual associated with the insurance policy), such as mobile device 10 of FIG. 1, to be displayed on the mobile device for review, modification, or approval by the driver or other individual.

As can be seen from the above discussion, the method 100 may enable fault to be more reliably and/or accurately determined with respect to a vehicle accident, which may in turn allow more accurate and efficient claim handling, and/or more accurate and efficient adjustment, generation and/or updating of insurance-related items. Moreover, components in the example system 1 may complete their tasks more quickly and/or efficiently, and/or the resource usage or consumption of components in the example system 1 may be reduced. For instance, a claim associate may need to initiate or receive fewer communications with an insured (e.g., via mobile device 10 and/or network 30) and/or other individuals, and/or the processor 62 may consume less time and/or fewer processing cycles in handling a claim, if the data collected from some or all of the sources shown in front-end components 2 of FIG. 1 is complete or informative enough to avoid the need for extensive follow-up investigation.

VII. Additional Exemplary Fault Determination Method

In one aspect, a computer-implemented method of accident cause and/or fault determination may be provided. The method may include (1) collecting or receiving telematics and/or other data at or via a remote server associated with an insurance provider, the telematics and/or other data being associated with a vehicle accident involving a specific driver and/or an insured. The insured may own an insurance policy issued by the insurance provider, and/or the telematics and/or other data may be gathered before, during, and/or after the vehicle accident. The method may include (2) analyzing the telematics and/or other data at and/or via the remote server; (3) determining, at and/or via the remote server, fault or a percentage of fault of the vehicle accident that is assigned or attributed to the specific driver and/or the insured from the analysis of the telematics and/or other data; (4) using the fault or percentage of fault that is assigned or attributed to the specific driver and/or the insured to handle and/or address, at and/or via the remote server, an insurance claim associated with the vehicle accident; and/or (5) using the fault or percentage of fault that is assigned or attributed to the specific driver and/or the insured to adjust, generate, and/or update, at and/or via the remote server, an insurance policy, premium, rate, discount, and/or reward for the specific driver and/or the insured. The method may include additional, fewer, or alternate actions, including those discussed elsewhere herein.

For instance, the method may further include transmitting information related to an adjusted, generated, and/or updated insurance policy, premium, rate, discount, and/or reward from the remote server to a mobile device associated with the specific driver and/or insured to facilitate presenting, on a display of the mobile device, all or a portion of the adjusted, generated, and/or updated insurance policy, premium, rate, discount, and/or reward to the specific driver and/or insured for review, modification, and/or approval.

Analyzing the telematics and/or other data at the remote server to determine fault or a percentage of fault of the vehicle accident may involve analysis of driver behavior and/or acuity before, during, and/or after the vehicle accident using the telematics and/or other data received or collected. Additionally or alternatively, analyzing the telematics and/or other data at the remote server to determine fault or a percentage of fault of the vehicle accident may involve analysis of road, weather, traffic, and/or construction conditions associated with a location of the vehicle accident before, during, and/or after the vehicle accident using the telematics and/or other data received or collected.

Analyzing the telematics and/or other data at the remote server to determine fault or a percentage of fault of the vehicle accident may also involve analysis of behavior and/or actions taken by another driver other than the insured that is involved with the vehicle accident, and/or other vehicle accidents that occurred at the location of the accident, such as at a busy intersection.

The telematics and/or other data may include data associated with, or generated by, mobile devices, such as smart phones, smart glasses, and/or smart wearable electronic devices capable of wireless communication. Additionally or alternatively, the telematics and/or other data may include data associated with, or generated by, an insured vehicle or a computer system of the insured vehicle. The telematics and/or other data may further include data associated with, or generated by, (i) a vehicle other than the insured vehicle;

(ii) vehicle-to-vehicle (V2V) communication; and/or (iii) road side equipment or infrastructure located near a location of the vehicle accident.

VIII. Exemplary Accident Reconstruction Method

Figure 4:
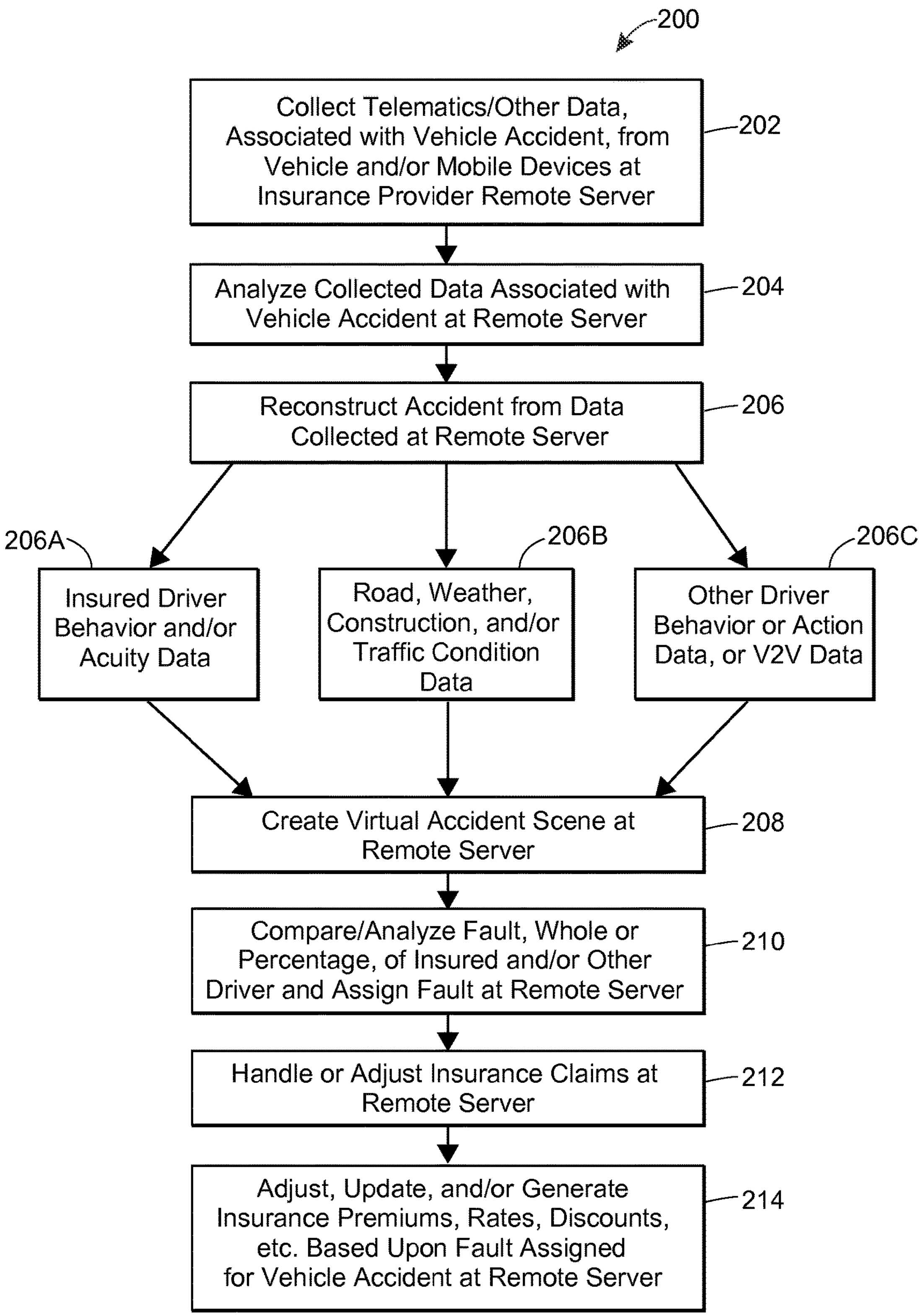
FIG. 4 illustrates an exemplary computer-implemented method of accident scene reconstruction for an insured event, according to one embodiment.

FIG. 4 illustrates an exemplary computer-implemented method 200 of accident or accident scene reconstruction for a vehicle accident. In some embodiments, the method 100 may be implemented in whole or in part by one or more components of the system 1 depicted in FIG. 1. For example, the method 200 may be implemented by one or more servers remote from the components (e.g., sensors, vehicles, mobile devices, etc.) sourcing telematics data, such as the server 40 (e.g., processor(s) 62 of the server 40 when executing instructions stored in the program memory 60 of the server 40) or another server not shown in FIG. 1.

The method 200 may include collecting accident data associated with a vehicle accident involving a driver (block 202). The driver may be associated with an insurance policy issued by the insurance provider (e.g., an owner of the policy, or another individual listed on the policy). The accident data may include telematics data, and possibly other data, collected from one or more sources. For example, the accident data may include data associated with or generated by one or more mobile devices (e.g., mobile device 10 of FIGS. 1 and 2); an insured vehicle or a computer system of the insured vehicle (e.g., vehicle 8 or smart vehicle controller 14 of FIGS. 1 and 2, or one or more sensors mounted on the vehicle); a vehicle other than the insured vehicle (e.g., vehicle 6 of FIG. 1); vehicle-to-vehicle (V2V) communication (e.g., communications between vehicle 8 and vehicle 6 in FIG. 1); and/or roadside equipment or infrastructure located near a location of the vehicle accident (e.g., infrastructure components 26 of FIG. 1). Generally, the accident data may include any one or more of the types of data discussed above in Section I and/or II (and/or other suitable types of data), and may be collected according to any of the techniques discussed above in Section I and/or II (and/or other suitable techniques). The accident data may have been generated by the respective source(s), and/or collected, before, during and/or after the accident.

The method 200 may also include analyzing any or all of the collected accident data (block 204), reconstructing the accident from the accident data (block 206), and creating a virtual accident scene (block 208). As shown in FIG. 4, for example, insured driver behavior and/or acuity data may be analyzed to reconstruct the accident (block 206A), road, weather, construction, and/or traffic conditions data may be analyzed to reconstruct the accident (block 206B), and/or other vehicle and/or other driver behavior or action data may be analyzed to reconstruct the accident (block 206C). As a more specific example, driver acuity data (e.g., phone usage data) collected from the insured's vehicle and/or mobile device may be analyzed to determine precisely when, in relation to the time of the accident, the insured was or was not likely distracted (e g, talking on the phone). As another example, weather data (e.g., collected by a mobile device or vehicle-mounted camera, or from a remote server) may be analyzed to determine weather conditions, such as rain, snow or fog, during and/or just prior to the accident. As yet another example, other driver behavior data (e.g., collected by a sensor mounted on the insured's vehicle, or a roadside camera or other sensor, etc.) may be analyzed to determine the speed, direction, lane usage, etc., of one or more drivers other than the insured.

Block 206 may include, for example, determining a sequence of events for the accident, and block 208 may include generating a virtual reconstruction of the accident (and/or a scene of the accident) based upon the sequence of events. The sequence of events may include events occurring before, during, and/or after the accident. The events may include any types of occurrences, such as vehicle movements, driver actions (e.g., stepping on the brake pedal, talking on a smart phone, etc.), traffic light changes, and so on. The virtual reconstruction may depict/represent not only the sequence of events, but also various states/conditions that exist while the sequence of events occurs. For instance, the virtual reconstruction may include an animated graphical depiction of two or more vehicles involved in the vehicle accident before and during the accident, while also depicting driver acuity, weather conditions, traffic conditions, and/or construction conditions. The vehicles and/or conditions may be depicted at the time of the accident, and at (or in the vicinity of) the vehicle accident, for example. In some embodiments, the virtual reconstruction may be superimposed upon a map.

The method 200 may also include determining (e.g., based upon a virtual reconstruction of the accident generated at block 208) fault of the driver for the accident. As seen in FIG. 4, for example, the fault for the driver (e.g., the insured) and/or for another driver may be compared or otherwise analyzed (block 210). The fault may be determined by processing/analyzing features of the generated virtual reconstruction, for example, or by displaying the virtual reconstruction to a user (e.g., insurance provider employee) for human interpretation/analysis, for example.

The fault may be determined as one or more binary indicators (e.g., "at fault" or "not at fault"), percentages (e.g., "25% responsible"), ratios or fractions, and/or any other suitable indicator(s) or measure(s) of fault. In some embodiments and/or scenarios, fault for a first individual is implicitly determined based upon the fault that is explicitly determined for another individual (e.g., an insured may implicitly be determined to have 0% fault if another driver is explicitly determined to be 100% at fault).

The method 200 may also include using the fault determined at block 210 to handle an insurance claim associated with the accident (block 212). For example, the determined fault of the driver (e.g., insured) may be used to determine or adjust the appropriate payout by the insurance provider, or to determine whether another insurance provider should be responsible for payment, etc.

The method 200 may also include using the fault determined at blocks 210 to adjust, generate and/or update one or more insurance-related items (block 214). The insurance-related item(s) may include, for example, parameters of the insurance policy (e.g., a deductible), a premium, a rate, a discount, and/or a reward. As a more specific example, if it is determined that the driver (e.g., insured) is at least partially at fault, the driver's insurance premium may be increased.

In other embodiments, the method 200 may include additional, fewer, or alternate actions as compared to those shown in FIG. 4, including any of those discussed elsewhere herein. For example, the method 200 may further include transmitting information indicative of the adjusted, generated, or updated insurance-related items to a mobile device associated with the driver (or another individual associated with the insurance policy), such as mobile device 10 of FIG. 1, to be displayed on the mobile device for review, modification, or approval by the driver or other individual.

As can be seen from the above discussion, the method 200 may enable accurate reconstruction of an accident, which may in turn allow more accurate and efficient claim handling, and/or more accurate and efficient adjustment, generation and/or updating of insurance-related items. Moreover, components in the example system 1 may complete their tasks more quickly and/or efficiently, and/or the resource usage or consumption of components in the example system 1 may be reduced. For instance, a claim associate may need to initiate or receive fewer communications with an insured (e.g., via mobile device 10 and/or network 30) and/or other individuals, and/or the processor 62 may consume less time and/or fewer processing cycles in handling a claim, if the data collected from some or all of the sources shown in front-end components 2 of FIG. 1 is complete or informative enough to re-create an accident scene without the need for extensive follow-up investigation.

IX. Additional Exemplary Accident Reconstruction Method

In one aspect, a computer-implemented method of accident scene reconstruction may be provided. The method may include (1) collecting or receiving telematics and/or other data at or via a remote server associated with an insurance provider, the telematics and/or other data being associated with a vehicle accident involving a specific driver and/or an insured. The insured may own an insurance policy issued by the insurance provider, and the telematics and/or other data may be gathered before, during, and/or after the vehicle accident. The method may include (2) analyzing the telematics and/or other data at and/or via the remote server; (3) determining a sequence of events occurring before, during, and/or after the vehicle accident, at and/or via the remote server, from the analysis of the telematics and/or other data; (4) generating a virtual reconstruction of the vehicle accident and/or accident scene, at and/or via the remote server, from the sequence of events determined from the analysis of the telematics and/or other data; (5) determining, at and/or via the remote server, fault or a percentage of fault of the vehicle accident that is assigned or attributed to the specific driver and/or the insured from the virtual reconstruction of the vehicle accident and/or accident; and/or (6) using the fault or percentage of fault that is assigned or attributed to the specific driver and/or the insured to handle and/or address (either entirely or partially), at and/or via the remote server, an insurance claim associated with the vehicle accident.

The method may include using the fault or percentage of fault that is assigned or attributed to the specific driver and/or the insured to adjust, generate, and/or update, via the remote server, an insurance policy, premium, rate, discount, and/or reward for the specific driver and/or the insured. The method may also include transmitting information related to the adjusted, generated, and/or updated insurance policy, premium, rate, discount, and/or reward from the remote server to a mobile device associated with the specific driver and/or insured to facilitate presenting, on a display of the mobile device, all or a portion of the adjusted, generated, and/or updated insurance policy, premium, rate, discount, and/or reward to the specific driver and/or insured for their review, modification, and/or approval.

The method may include analyzing the telematics and/or other data at or via the remote server to determine a sequence of events occurring before, during, and/or after the vehicle accident and generating a virtual reconstruction. The analysis may involve analyzing driver behavior and/or acuity of the specific driver and/or insured before, during, and/or after the vehicle accident using the telematics and/or other data. The analysis may also include analyzing road, weather, traffic, and/or construction conditions associated with a location of the vehicle accident before, during, and/or after the vehicle accident, and/or of other vehicle accidents that occurred at the location of the accident, such as at a busy intersection. The analysis may further include analyzing behavior and/or actions taken by another driver (other than the insured) that is involved with the vehicle accident.

The virtual reconstruction of the vehicle accident and/or accident scene may include an animated graphical depiction of two or more vehicles involved in the vehicle accident before and during the accident, and may also depict weather, traffic, and/or construction conditions at the time of the accident and/or in the vicinity of the vehicle accident superimposed upon a map. Additionally or alternatively, the virtual reconstruction of the vehicle accident and/or accident scene may include an animated graphical depiction of a single vehicle involved in the vehicle accident before and during the accident. The speed, acceleration, deceleration, traveling direction, route, destination, location, number of passengers, type of vehicle, and/or other items associated with each vehicle depicted may also be graphically depicted by the virtual reconstruction.

The telematics and/or other data may include the data described elsewhere herein. The method of accident reconstruction may include additional, fewer, or alternate actions, including those discussed elsewhere herein.

X. Exemplary Buildup Identification Method

Figure 5:
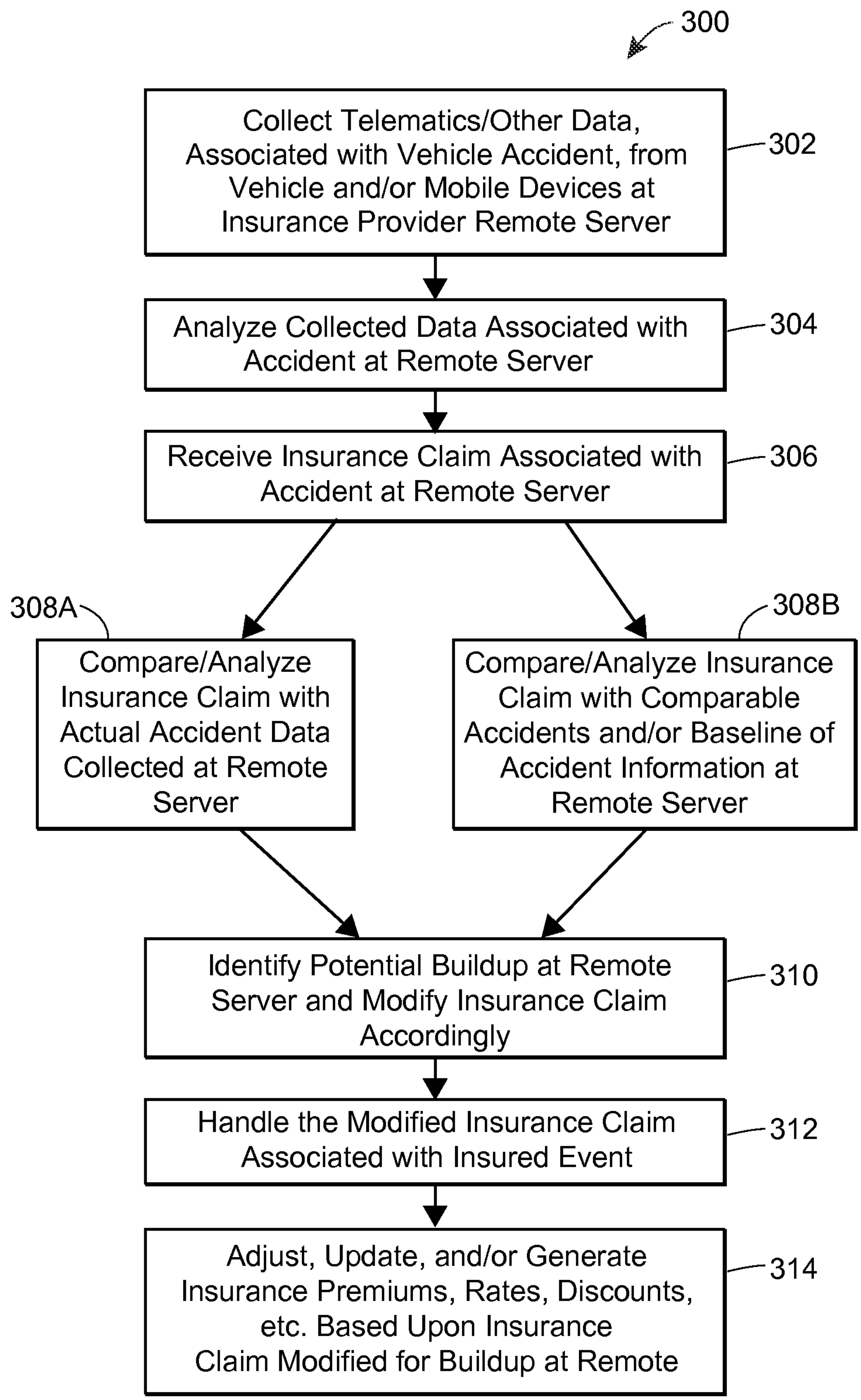
FIG. 5 illustrates an exemplary computer-implemented method of overstated claim or buildup identification, according to one embodiment.

FIG. 5 illustrates an exemplary computer-implemented method 300 for identifying buildup of an insurance claim relating to a vehicle accident. In some embodiments, the method 300 may be implemented in whole or in part by one or more components of the system 1 depicted in FIG. 1. For example, the method 300 may be implemented by one or more servers remote from the components (e.g., sensors, vehicles, mobile devices, etc.) sourcing telematics data, such as the server 40 (e.g., processor(s) 62 of the server 40 when executing instructions stored in the program memory 60 of the server 40) or another server not shown in FIG. 1.

The method 300 may include collecting accident data associated with a vehicle accident involving a driver (block 302). The driver may be associated with an insurance policy issued by the insurance provider (e.g., an owner of the policy, or another individual listed on the policy). The accident data may include telematics data, and possibly other data, collected from one or more sources. For example, the accident data may include data associated with or generated by one or more mobile devices (e.g., mobile device 10 of FIGS. 1 and 2); an insured vehicle or a computer system of the insured vehicle (e.g., vehicle 8 or smart vehicle controller 14 of FIGS. 1 and 2, or one or more sensors mounted on the vehicle); a vehicle other than the insured vehicle (e.g., vehicle 6 of FIG. 1); vehicle-to-vehicle (V2V) communication (e.g., communications between vehicle 8 and vehicle 6 in FIG. 1); and/or roadside equipment or infrastructure located near a location of the vehicle accident (e.g., infrastructure components 26 of FIG. 1). Generally, the accident data may include any one or more of the types of data discussed above in Section I and/or II (and/or other suitable types of data), and may be collected according to any of the techniques discussed above in Section I and/or II (and/or other suitable techniques). The accident data may have been generated by the respective source(s), and/or collected, before, during and/or after the accident.

The method 300 may also include analyzing any or all of the collected accident data (block 304). The accident data may be analyzed to identify the type of accident, a classification of the accident, and/or a severity of the accident. For example, the accident may be classified as an "x-car accident," where x represents the number of vehicles involved. As another example, the accident may be classified as "side impact," "rear-end collision" or "head-on collision." As yet another example, it may be determined that the accident qualifies as a "low," "moderate," or "high" severity accident (e.g., in terms of likely vehicle damage and/or personal injury).

An insurance claim associated with the vehicle accident may be received (block 306). The insurance claim may have been generated/initiated by a claim associate of the insurance provider based upon information obtained from the driver (e.g., over the phone), for example, and/or received from an enterprise claim system of the insurance provider.

The insurance claim may be compared with, or otherwise analyzed in view of, the accident data collected at block 302 (block 308A). Also, or instead, the insurance claim may be compared with, or otherwise analyzed in view of, comparable accidents and/or a baseline of accident information (block 308B). For example, the method 300 may include determining an average/typical insurance claim for vehicle accidents associated with the same type, classification and/or severity of accident that was/were identified at block 304, and at block 308 the insurance claim received at block 306 may be compared with that average insurance claim.

The method 300 may also include identifying potential/likely claim buildup, and modifying the insurance claim accordingly (block 310). The identification of buildup may be based upon the comparison (e.g., to an average/typical claim of the same type, classification and/or severity) at block 308B, for example. As a more specific example, likely buildup may be identified (and an agent of the insurance provider may investigate further, etc.) if the accident is identified as being in the class "rear-end collision, <5 mph," and it is determined that an average/typical insurance claim for such accidents involves a much lower amount (and/or much different type) of vehicle damage than was reported to the insurance provider. The insurance claim may be modified by changing a damage amount and/or personal injury description associated with the claim, for example, and/or further investigation may be initiated.

The method 300 may also include handling the modified insurance claim (block 312). For example, a modified vehicle damage amount may be used to determine the appropriate payout, if any, by the insurance provider.

The method 300 may further include using the modified insurance claim to adjust, generate and/or update one or more insurance-related items (block 314). The insurance-related item(s) may include, for example, parameters of the insurance policy (e.g., a deductible), a premium, a rate, a discount, and/or a reward.

In other embodiments, the method 300 may include additional, fewer, or alternate actions as compared to those shown in FIG. 5, including any of those discussed elsewhere herein. For example, the method 300 may further include transmitting information indicative of the adjusted, generated, or updated insurance-related items to a mobile device associated with the driver (or another individual associated with the insurance policy), such as mobile device 10 of FIG. 1, to be displayed on the mobile device for review, modification, or approval by the driver or other individual.

As can be seen from the above discussion, the method 300 may enable accurate and efficient buildup detection, which may in turn allow more accurate and efficient claim handling, and/or more accurate and efficient adjustment, generation and/or updating of insurance-related items. Moreover, components in the example system 1 may complete their tasks more quickly and/or efficiently, and/or the resource usage or consumption of components in the example system 1 may be reduced. For instance, a claim associate may need to initiate or receive fewer communications with an insured (e.g., via mobile device 10 and/or network 30) and/or other individuals, and/or the processor 62 may consume less time and/or fewer processing cycles in handling a claim, if the data collected from some or all of the sources shown in front-end components 2 of FIG. 1 is complete or informative enough to determine what happened before and/or during an accident without the need for extensive follow-up investigation.

XI. Additional Exemplary Buildup Identification Method

In one aspect, a computer-implemented method of buildup identification may be provided. The method may include (1) collecting or receiving telematics and/or other data at a remote server associated with an insurance provider, the telematics and/or other data being associated with a vehicle accident involving a specific driver and/or an insured. The insured may own an insurance policy issued by the insurance provider and the telematics and/or other data may be gathered before, during, and/or after the vehicle accident. The method may include (2) analyzing the telematics and/or other data at and/or via the remote server to identify a type, classification, and/or severity of the vehicle accident; (3) determining an average insurance claim for vehicle accidents associated with the type, classification, and/or severity of the vehicle accident, such as at and/or via the remote server; (4) receiving, at and/or via the remote server, an insurance claim associated with the vehicle accident; (5) comparing, at and/or via the remote server, the insurance claim with the average insurance claim for vehicle accidents associated with the type, classification, and/or severity of the vehicle accident; and/or (6) identifying likely buildup or overstatement of the insurance claim, at and/or via the remote server, based upon the comparison such that investigation and/or adjustment of the insurance claim is facilitated. The method may include additional, fewer, or alternate actions, including those discussed elsewhere herein.

For instance, the method may further comprise adjusting or updating, at and/or via the remote server, the insurance claim to account for the likely buildup or overstatement of the insurance claim, and/or transmitting information related to the adjusted and/or updated insurance claim from the remote server to a mobile device associated with the specific driver and/or insured to facilitate presenting, on a display of the mobile device, all or a portion of the adjusted and/or updated insurance claim to the specific driver and/or insured for their review, modification, and/or approval.

The telematics and/or other data may include the types of data discussed elsewhere herein. Also, identifying likely buildup or overstatement of the insurance claim may involve identifying buildup of (i) vehicle damage and/or (ii) personal injury or injuries from analysis of the telematics and/or other data.

XII. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and systems disclosed herein without departing from the spirit and scope defined in the appended claims. Finally, the patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method of accident scene reconstruction, the method comprising:

generating, by one or more sensors of a mobile computing device associated with a driver, accident data associated with a vehicle during a time period including a vehicle accident, the accident data including vehicle telematics data from the one or more sensors indicating acceleration or velocity of the vehicle, and the accident data including audio or video data associated with the interior of the vehicle from the one or more sensors;

collecting, by one or more remote servers associated with an insurance provider from an application of the mobile computing device, the accident data, wherein the accident data is associated with the driver, and the driver being associated with an insurance policy issued by the insurance provider;

analyzing, by the one or more remote servers, the accident data to determine (i) vehicle movement at a plurality of times associated with the vehicle accident based upon the vehicle telematics data and (ii) mobile phone usage by the driver during the vehicle accident based upon the audio or video data;

determining, by the one or more remote servers and based upon the analysis of the accident data, a sequence of events occurring one or more of before, during, or after the vehicle accident;

generating, by the one or more remote servers and based upon the determined sequence of events, a virtual reconstruction of one or both of (i) the vehicle accident and (ii) a scene of the vehicle accident;

determining, by the one or more remote servers and based upon the virtual reconstruction and the mobile phone usage by the driver, fault of the driver for the vehicle accident; and using the determined fault of the driver to handle, at the one or more remote servers, an insurance claim associated with the vehicle accident.

2. The computer-implemented method of claim 1, the method further comprising using the determined fault of the driver to adjust, generate, or update, at the one or more remote servers, one or more insurance-related items, the one or more insurance-related items including one or more of (i) parameters of the insurance policy; (ii) a premium; (iii) a rate; (iv) a discount; or (v) a reward.

3. The computer-implemented method of claim 1, the method further comprising transmitting information indicative of the adjusted, generated, or updated insurance-related items from the one or more remote servers to a mobile device associated with either the driver or another individual associated with the insurance policy, to be displayed on the mobile device for review, modification, or approval by the driver or other individual.

4. The computer-implemented method of claim 1, wherein analyzing the accident data further includes using the accident data to analyze driver behavior of the driver at least one of before, during or after the vehicle accident.

5. The computer-implemented method of claim 1, wherein analyzing the accident data further includes using the accident data to analyze driver acuity of the driver at least one of before, during or after the vehicle accident.

6. The computer-implemented method of claim 1, further comprising analyzing, by the one or more remote servers, additional data associated with the vehicle accident to determine conditions that were associated with a location of the vehicle accident at least one of before, during or after the vehicle accident, the conditions including one or more of (i) road conditions; (ii) weather conditions; (iii) traffic conditions; or (iv) construction conditions.

7. The computer-implemented method of claim 1, further comprising analyzing, by the one or more remote servers, additional data associated with the vehicle accident to determine driver behavior of another driver involved in the vehicle accident at least one of before, during or after the vehicle accident.

8. The computer-implemented method of claim 1, wherein generating a virtual reconstruction includes generating an animated graphical depiction of (i) two or more vehicles involved in the vehicle accident before and during the accident, and (ii) one or more of weather conditions, traffic conditions, or construction conditions, at the time of the accident and at or in the vicinity of the vehicle accident, the virtual reconstruction being superimposed upon a map.

9. The computer-implemented method of claim 1, further comprising generating, by an insured vehicle or a computer system of the insured vehicle, additional accident data, wherein the sequence of events is further determined based in part upon the additional accident data.

10. The computer-implemented method of claim 9, wherein the additional accident data is associated with, or generated by, one or more of (i) a vehicle other than the insured vehicle; (ii) vehicle-to-vehicle (V2V) communication; or (iii) roadside equipment or infrastructure located near a location of the vehicle accident.

11. A system for accident scene reconstruction, the system comprising:

one or more processors; and one or more memories storing instructions that, when executed by the one or more processors, cause the one or more processors to:

generate accident data associated with a vehicle during a time period including a vehicle accident using one or more sensors of a mobile computing device associated with a driver, the accident data including vehicle telematics data from the one or more sensors indicating acceleration or velocity of the vehicle, and the accident data including audio or video data associated with the interior of the vehicle from the one or more sensors, collect the accident data from an application of the mobile computing device, wherein the accident data is associated with the driver, and the driver being associated with an insurance policy issued by an insurance provider, analyze the accident data to determine (i) vehicle movement at a plurality of times associated with the vehicle accident based upon the vehicle telematics data and (ii) mobile phone usage by the driver during the vehicle accident based upon the audio or video data, determine, based upon the analysis of the accident data, a sequence of events occurring one or more of before, during, or after the vehicle accident, generate, based upon the determined sequence of events, a virtual reconstruction of one or both of (i) the vehicle accident and (ii) a scene of the vehicle accident, determine, based upon the virtual reconstruction and the mobile phone usage by the driver, fault of the driver for the vehicle accident, and use the determined fault of the driver to handle an insurance claim associated with the vehicle accident.

12. The system of claim 11, further comprising a communication interface, wherein the instructions, when executed by the one or more processors, further cause the one or more processors to transmit, via the communication interface, information indicative of the adjusted, generated, or updated insurance-related items to a mobile device associated with either the driver or another individual associated with the insurance policy, to be displayed on the mobile device for review, modification, or approval by the driver or other individual.

13. The system of claim 11, wherein the instructions further cause the one or more processors to analyze the accident data at least by using the accident data to analyze driver behavior of the driver.

14. The system of claim 11, wherein the instructions further cause the one or more processors to analyze the accident data at least by using the accident data to analyze driver acuity of the driver.

15. The system of claim 11, wherein the instructions further cause the one or more processors to analyze additional data to determine one or more of road conditions, weather conditions, traffic conditions, or construction conditions associated with a location of the vehicle accident.

16. The system of claim 11, wherein the instructions further cause the one or more processors to analyze additional data to determine driving behavior of another driver involved in the vehicle accident.

17. The system of claim 11, wherein the virtual reconstruction:

includes an animated graphical depiction of (i) two or more vehicles involved in the vehicle accident before and during the accident, and (ii) one or more of weather conditions, traffic conditions, or construction conditions, at the time of the accident and at or in the vicinity of the vehicle accident; and is superimposed upon a map.

18. The system of claim 11, wherein the instructions further cause the one or more processors to collect additional data associated with, or generated by, one or more of (i) vehicle-to-vehicle (V2V) communication; or (iii) roadside equipment or infrastructure located near a location of the vehicle accident, and wherein the sequence of events is further determined based in part upon the additional accident data.

* * * * *